(12) United States Patent
Nomura et al.

(10) Patent No.: US 8,461,261 B2
(45) Date of Patent: *Jun. 11, 2013

(54) ENGINEERING PLASTIC RESIN COMPOSITION CONTAINING GRAFT COPOLYMER

(75) Inventors: Manabu Nomura, Chiba (JP); Susumu Kanno, Chiba (JP); Ryo Aburatani, Chiba (JP); Shuji Machida, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/812,521

(22) PCT Filed: Jan. 14, 2009

(86) PCT No.: PCT/JP2009/050348
§ 371 (c)(1),
(2), (4) Date: Oct. 4, 2010

(87) PCT Pub. No.: WO2009/090949
PCT Pub. Date: Jul. 23, 2009

(65) Prior Publication Data
US 2011/0021703 A1   Jan. 27, 2011

(30) Foreign Application Priority Data
Jan. 15, 2008 (JP) .................. 2008-006096

(51) Int. Cl.
C08G 63/46 (2006.01)
C08L 51/00 (2006.01)
C08F 255/00 (2006.01)

(52) U.S. Cl.
USPC ............. 525/64; 525/69; 525/70; 525/240; 525/242; 525/285; 525/301; 524/528

(58) Field of Classification Search
USPC . 525/64, 69, 70, 240, 242, 285, 301; 524/528
See application file for complete search history.

(56) References Cited

U.S. PATENT DOCUMENTS
2004/0102581 A1   5/2004   Dang et al.
2005/0171295 A1   8/2005   Kanamaru et al.
2006/0025508 A1   2/2006   Lechner et al.
2010/0076146 A1 *  3/2010   Machida et al. ............ 524/528
2010/0324242 A1 * 12/2010   Machida et al. ............ 526/160

FOREIGN PATENT DOCUMENTS

| EP | 1 719 786 A1 | 11/2006 |
|---|---|---|
| JP | 55 009662 | 1/1980 |
| JP | 55 021430 | 2/1980 |
| JP | 02 160813 | 6/1990 |
| JP | 08 059970 | 3/1996 |
| JP | 2001 302873 | 10/2001 |
| JP | 2005 247970 | 9/2005 |
| JP | 2005 290176 | 10/2005 |
| JP | 2006 037103 | 2/2006 |
| JP | 2006 508214 | 3/2006 |
| JP | 2007204700 A * | 8/2007 |
| WO | 03 087172 | 10/2003 |
| WO | 2004 039882 | 5/2004 |
| WO | 2004 048466 | 6/2004 |
| WO | 2007 091478 | 8/2007 |
| WO | 2008 066168 | 6/2008 |

OTHER PUBLICATIONS

Machine Translation of JP 2007204700.*
Partial Translation of JP 2007-204700.*
Supplementary Search Report issued May 2, 2011 in European Patent Application No. 09702632.2—1214 / 2236558.
U.S. Appl. No. 12/865,337, filed Jul. 29, 2010, Machida, et al.

* cited by examiner

Primary Examiner — Mark Kaucher
(74) Attorney, Agent, or Firm — Oblon, Spivak, McClelland, Maier & Neustadt, L.L.P.

(57) ABSTRACT

Provided is a resin composition containing a resin component prepared by blending a graft copolymer with an engineering plastic, wherein the above graft copolymer is a graft copolymer satisfying (a) to (e) shown below:
(a) a graft rate is 1 to 150% by mass,
(b) a weight average molecular weight measured by GPC is 500 to 400000,
(c) a molecular weight distribution (Mw/Mn) is 1.5 to 4,
(d) a main chain is a polymerization chain containing 1 to 100% by mass of a monomer unit having a functional group interacting with the engineering plastic and
(e) a side chain is a homopolymerization chain of a single kind selected from α-olefins having 3 to 28 carbon atoms or a copolymerization chain of two or more kinds selected therefrom or a copolymerization chain comprising an α-olefin unit having 3 to 28 carbon atoms and an ethylene unit which accounts for 50% by mass or less, and a meso-pentad ratio [mmmm] of the polymerization chain is 30 to 80 mole %.

13 Claims, No Drawings

ENGINEERING PLASTIC RESIN COMPOSITION CONTAINING GRAFT COPOLYMER

BACKGROUND OF THE INVENTION

The present invention relates to a resin composition containing a resin component prepared by blending a graft copolymer and an engineering plastic, more specifically to a resin composition containing a resin component prepared by blending a graft copolymer having a main chain comprising a specific monomer unit and a side chain which is a specific polyolefin chain with an engineering plastic.

RELATED ART

In general, engineering plastics such as polyacetal, polyamide, polycarbonate and the like are excellent in a heat resistance and mechanical properties, but they have the defect that they are inferior in a molding processability and an impact strength. On the other hand, polyolefins are excellent in a moldability and chemically stable but have the defect that they are inferior in performances such as a barrier property and the like.

In recent years, polymer alloy technologies are developed, and materials such as composite materials of engineering plastics and polyolefins are developed to try to supplement the defects of both. In developing the above composite materials, it is important to develop compatible components, and modified polymers of a polyolefin base have so far been developed and used as a compatible component.

For example, a patent document 1 discloses pipes and the like containing a molten mixed blend of polyamide, incompatible polyolefin and an alkyl carboxyl-substituted polyolefin compatible agent, wherein polyamide is present in the form of a discontinuous phase in which polyamide is dispersed in a polyolefin matrix, and it is described as an effect thereof that the pipes have a strengthened resistance against permeation of hydrocarbons as compared with polyethylene.

A patent document 2 discloses a composition containing an oxidized olefin polymer substance containing a carboxylic acid group and the like and an engineering thermoplastic resin, and it is described therein that the good barrier property is shown.

A patent document 3 discloses a resin composition containing polybutylene terephthalate, an olefin base elastomer, an epoxy compound and the like, and it is described therein that the heat shock resistance is improved.

A patent document 4 discloses a polyester base polymer alloy comprising a polyester resin, an ethylene.alkyl (meth) acrylate.glycidyl (meth)acrylate copolymer and an ethylene copolymer, and it is described therein that the polyester base polymer alloy which is improved in mechanical properties and a molding processability is obtained.

A patent document 5 discloses a production process for a thermoplastic polyester resin composition comprising a thermoplastic polyester and a modified ethylene polymer, and it is described therein that a thermoplastic polyester resin composition which is excellent in an impact resistance and an appearance is obtained.

A patent document 6 discloses a production process for a polyamide resin composition comprising polyamide and a modified ethylene polymer, and it is described therein that a polyamide resin composition which is excellent in an impact resistance and an appearance is obtained.

A patent document 7 discloses a thermoplastic resin composition comprising a thermoplastic polyester matrix resin and a specific EPDM polymer, and it is described therein that the thermoplastic resin composition for molding which is improved in an impact property is obtained.

A patent document 8 discloses a saturated polyester resin composition containing a saturated polyester and a modified olefin base elastomer, and it is described therein that a thermoplastic resin composition which is excellent in a mechanical strength and an appearance of the molded article is obtained.

A patent document 9 discloses a resin composition containing a polyphenylene ether base resin and a polypropylene base resin, and it is described therein that the resin composition which is reduced in black spots generated on the resin composition and which is excellent in a mechanical strength is provided.

A patent document 10 discloses a method in which a polyolefin wax is used as a processing auxiliary agent, a dispersant and the like in a polycondensation product such as polyamides and the like.

As shown above, various compatible components have so far been disclosed. However, the above compatible components do not necessarily have satisfactory performances, and problems have been brought about in shortage of performances as a compatible component, a fluidity, an impact resistance, mechanical properties, a bleeding property of wax onto a die surface and the like. Accordingly, compatible components having more excellent performances and resin compositions containing the same are expected to be developed.

Patent document 1: Japanese Patent Application Laid-Open (through PCT) No. 504828/2006
Patent document 2: Japanese Patent Application Laid-Open (through PCT) No. 508214/2006
Patent document 3: Japanese Patent Application Laid-Open No. 290176/2005
Patent document 4: Japanese Patent Application Laid-Open No. 247970/2005
Patent document 5: Japanese Patent Application Laid-Open No. 21430/1980
Patent document 6: Japanese Patent Application Laid-Open No. 9662/1980
Patent document 7: Japanese Patent Application Laid-Open No. 160813/1990
Patent document 8: Japanese Patent Application Laid-Open No. 59970/1996
Patent document 9: Japanese Patent Application Laid-Open No. 302873/2001
Patent document 10: Japanese Patent Application Laid-Open No. 37103/2006

DISCLOSURE OF THE INVENTION

Conventional compatible components include those comprising polyolefin as a main chain and having a side chain to which a small amount of a modifying agent is added and those in which a small amount of a modifying agent is added to an end of a main chain. When the compatible components having such structures as described above are used, problems have been involved therein in a terms of the performances. The present invention has been made under the above situations, and an object thereof is to provide a resin composition containing a resin component prepared by blending a graft copolymer in which a polyolefin chain is sufficiently long and which has a functional group interacting with an engineering plastic on a main chain and a specific engineering plastic, wherein physical properties can be enhanced by blending; a rise in a fluidity makes it possible to improve a moldability and reduce a thickness and a weight thereof; a mold release property in injection-molding can be enhanced; and an extrusion moldability can be improved.

The phrase "has a functional group interacting with an engineering plastic on a main chain" described above means that the main chain is a polymerization chain containing a monomer unit having the above functional group.

Intensive investigations repeated by the present inventors have resulted in finding that the object is achieved by a resin composition containing a resin component prepared by blending a graft copolymer having a main chain containing a specific monomer unit and a side chain which is a specific polyolefin chain with a specific engineering plastic. The present invention has been completed based on the above knowledge. That is, the present invention provides the following resin composition.

(1) A resin composition containing a resin component prepared by blending a graft copolymer with an engineering plastic, wherein the above graft copolymer is a graft copolymer satisfying (a) to (e) shown below:
(a) a graft rate is 1 to 150% by mass,
(b) a weight average molecular weight measured by GPC is 500 to 400000,
(c) a molecular weight distribution (Mw/Mn) is 1.5 to 4,
(d) a main chain is a polymerization chain containing 1 to 100% by mass of a monomer unit having a functional group interacting with the engineering plastic and
(e) a side chain is a homopolymerization chain of a single kind selected from α-olefins having 3 to 28 carbon atoms or a copolymerization chain of two or more kinds selected therefrom or a copolymerization chain comprising an α-olefin unit having 3 to 28 carbon atoms and an ethylene unit which accounts for 50% by mass or less, and a mesopentad ratio [mmmm] of the polymerization chain is 30 to 80 mole %.

(2) The resin composition according to the above item (1), wherein the graft copolymer is formed by copolymerization reaction of a reactive polyolefin satisfying (A) to (C) shown below with the monomer forming the main chain of the graft copolymer:
(A) an amount of an end unsaturated group per molecule is 0.5 to 1.0 group,
(B) a mesopentad ratio [mmmm] is 30 to 80 mole % and
(C) a homopolymerization chain of a single kind selected from α-olefins having 3 to 28 carbon atoms or a copolymerization chain of two or more kinds selected therefrom or a copolymerization chain comprising an α-olefin unit having 3 to 28 carbon atoms and ethylene which accounts for 50% by mass or less.

(3) The resin composition according to the above item (2), wherein the reactive polyolefin is produced under the presence of a metallocene catalyst.

(4) The resin composition according to the above item (3), wherein the metallocene catalyst is a di-cross-linked complex represented by Formula (I):

[Ka 1]

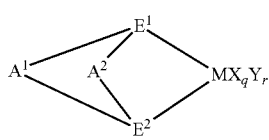

(I)

(wherein M represents a metal element of a 3rd to 10th group in the periodic table; $E^1$ and $E^2$ each represent a ligand selected from a cyclopentadienyl group, a substituted cyclopentadienyl group, an indenyl group, a substituted indenyl group, a heterocyclopentadienyl group, a substituted heterocyclopentadienyl group, an amide group, a phosphine group, a hydrocarbon group and a silicon-containing group, and they form a cross-linking structure via $A^1$ and $A^2$; $E^1$ and $E^2$ may be the same as or different from each other, and at least one of $E^1$ and $E^2$ is a cyclopentadienyl group, a substituted cyclopentadienyl group, an indenyl group or a substituted indenyl group; X represents a δ-bonding ligand, and when a plurality of X is present, plural X may be the same or different and may be cross-linked with other X, $E^1$, $E^2$ or Y; Y represents a Lewis base, and when a plurality of Y is present, plural Y may be the same or different and may be cross-linked with other Y, $E^1$, $E^2$ or X; $A^1$ and $A^2$ are divalent cross-linking groups which bond two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, and $R^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(valence of M)-2], and r represents an integer of 0 to 3).

(5) The resin composition according to the above item (1), wherein the functional group interacting with the engineering plastic is a functional group selected from an ester group, a carboxyl group, a carboxylic anhydride residue, an aromatic ring-containing group, a hydroxyl group, an epoxy group, an amino group and an isocyanate group.

(6) The resin composition according to the above item (1), wherein the monomer forming the main chain of the graft copolymer is at least one monomer represented by Formula (III):

[Ka 2]

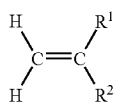

(III)

(wherein $R^1$ represents a hydrogen atom, a halogen atom or a hydrocarbon group having 1 to 12 carbon atoms; $R^2$ represents any of groups represented by Formulas (IV) to (VII):

[Ka 3]

(IV)

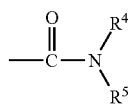

(V)

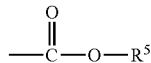

(VI)

-continued

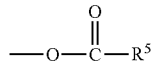
(VII)

$R^3$ represents a hydrogen atom, a hydrocarbon group having 1 to 12 carbon atoms or a group having 1 to 12 carbon atoms which contains any atom of an oxygen atom, a nitrogen atom and a silicon atom; $R^4$ represents a hydrogen atom or a hydrocarbon group having 1 to 12 carbon atoms; $R^5$ represents a hydrogen atom, a hydrocarbon group having 1 to 12 carbon atoms or a group having 1 to 12 carbon atoms which has any group of an epoxy group, an amino group, an isocyanate group, a hydroxyl group and a carboxyl group; and n is an integer of 0 to 5).

(7) The resin composition according to the above item (1), wherein the monomer forming the main chain of the graft copolymer is at least one selected from [I] acrylic acid and derivatives thereof, [II] methacrylic acid and derivatives thereof, [III] vinyl esters and derivatives thereof or alkoxyvinylsilane and [IV] styrene and derivatives thereof.

(8) The resin composition according to the above item (1), wherein the monomer forming the main chain of the graft copolymer is at least one selected from the following A group and at least one selected from the following B group:

A group: [V] maleic anhydride and substitution products thereof, [VI] maleic acid and esters thereof and [VII] maleimide and substitution products thereof and B group: [I] acrylic acid and derivatives thereof, [II] methacrylic acid and derivatives thereof, [III] vinyl esters and derivatives thereof or alkoxyvinylsilane, [IV] styrene and derivatives thereof and [VIII] α-olefins.

(9) The resin composition according to the above item (1), wherein the engineering plastic is selected from polyamide, polyacetal, polycarbonate, polyester, polyphenylene ether, syndiotactic polystyrene and polyphenylene sulfide.

(10) The resin composition according to the above item (1), wherein a blending amount of the engineering plastic is 1 to 1000 parts by mass based on 1 part by mass of the graft copolymer.

(11) The resin composition according to the above item (1), further containing polyolefin, wherein a blending amount of the polyolefin is 2 to 50 parts by mass, and a blending amount of the graft copolymer is 0.005 to 20 parts by mass each based on 100 parts by mass of the engineering plastic.

(12) A master batch containing the resin composition according to the above item (1).

(13) A molded matter prepared by using the resin composition according to the above item (1).

According to the present invention, obtained is a resin composition containing a resin component prepared by blending a graft copolymer in which a polyolefin chain is sufficiently long and which has a functional group interacting with an engineering plastic on a main chain with a specific engineering plastic. The graft copolymer described above has a high compatible ability, and use thereof in a small amount makes it possible to provide the excellent dispersion effect and inhibit bleeding. Further, it can be used as a reactive compatible agent and exerts an excellent compatible ability in various applications.

BEST MODE FOR CARRYING OUT THE INVENTION

The resin composition containing the resin component prepared by blending the graft copolymer with the engineering plastic according to the present invention is a resin composition containing a resin component prepared by blending a graft copolymer having a main chain comprising a specific monomer unit and a side chain which is a specific polyolefin chain with an engineering plastic. The graft copolymer described above is obtained by carrying out graft copolymerization reaction using a specific reactive polyolefin.

As described later, among the graft copolymers used in the present invention, those forming a covalent bond with an engineering plastic are included. Accordingly, "the resin composition containing the resin component prepared by blending the graft copolymer with the engineering plastic" shows not only a composition containing a graft copolymer and an engineering plastic but also a composition containing reaction products thereof.

Further, in the present specification, "the reactive polyolefin" shows a polyolefin which forms efficiently a graft copolymer by virtue of a radical initiator, and to be specific, it shows a polyolefin having 0.5 end unsaturated group or more per molecule.

Also, as can be found from the above definition, all molecules contained in the reactive polyolefin do not necessarily have end unsaturated groups and do not always have a reactivity. This allows unreacted polyolefin to be present in a certain case in finishing the copolymerization reaction, but an amount of the unreacted polyolefin can be reduced by controlling an amount of the end unsaturated groups or by a refining step. Accordingly, in the present specification, a reaction product in the copolymerization reaction is not referred to as "the composition", and it is described as "the graft copolymer".

Graft Copolymer:

A main chain of the graft copolymer contains a monomer unit having a functional group interacting with the engineering plastic (the "functional group interacting with the engineering plastic" shall be abbreviated as the functional group I" in the present specification). The interaction described above includes interaction in which a bond is formed by direct reaction thereof and interaction which is acted affinitively via a space. A specific example of a case in which a bond is formed by direct reaction thereof includes formation of a covalent bond, and a specific example of a case in which interaction is acted affinitively via a space includes hydrogen bonding, electrostatic interaction and stacking interaction of an aromatic ring and the like. In the present invention, plastics having a carboxyl group, an amino group, a group having a aromatic ring and an amide group are used as the engineering plastic. Accordingly, the functional group I in the graft copolymer includes an ester group, a carboxyl group, a carboxylic anhydride residue, an aromatic ring-containing group, a hydroxyl group, an epoxy group, an amino group, an isocyanate group and the like. In the present invention, the above interactions make it possible to enhance an affinity of the graft copolymer to the engineering plastic. The above interactions may be used alone or in combination of two or more kinds thereof.

The covalent bond described above includes condensation reaction and transesterification reaction of the functional group I in the graft copolymer with a functional group in the engineering plastic ("the functional group in the engineering plastic" shall be abbreviated as "the functional group II" in the present specification). An end functional group in the engineering plastic and a functional group obtained by carrying out modification treatment can be used as the functional group II. When the functional group II is a hydroxyl group, the functional group I is preferably a carboxyl group, an epoxy group, an isocyanate group and the like; when the functional group II is an epoxy group, the functional group I is preferably an amino group, a hydroxyl group and the like; when the functional group II is an amino group, the functional group I is preferably a carboxylic anhydride residue and a carboxyl group; when the functional group II is an isocyanate group, the functional group I is preferably a group having active hydrogen, particularly preferably a hydroxyl group, a phenolic hydroxyl group and a carboxyl group.

The specific examples of the hydrogen bond described above include interactions brought about between hydroxyl groups, between carboxyl groups, between a carbonyl group-a hydroxyl group, between an amide group-a hydroxyl group and the like. The electrostatic interaction includes interactions between atoms having δ– such as atoms having a high electronegativity including halogen atoms and oxygen atoms of a carbonyl group and atoms having δ+ such as carbon atoms of a carbonyl group. The stacking interaction of an aromatic ring and the like includes interactions between phenyl groups, between a phenyl group-a phenylene group and the like.

An amount of the monomer unit having the functional group I in the graft copolymer is 1 to 100% by mass based on the main chain. If it is less than 1% by mass, an effect for enhancing an affinity of the graft copolymer to the engineering plastic is less liable to be obtained. When the interaction is acted affinitively via a space, an amount of the monomer unit described above is preferably 50 to 100% by mass, more preferably 70 to 100% by mass. Further, when the interaction is brought about by forming a bond by direct reaction, it is preferably 2 to 80% by mass, more preferably 3 to 70% by mass.

The above monomer unit amount is a proportion based on an amount obtained by excluding that of the reactive olefin unit which is the side chain. As described later, the kind and an amount of the monomer unit in the main chain of the graft copolymer can be controlled by changing the kind and an amount of the monomer used in producing the graft copolymer.

The side chain of the graft copolymer is a homopolymerization chain of a single kind selected from α-olefins having 3 to 28 carbon atoms or a copolymerization chain of two or more kinds selected therefrom or a copolymerization chain comprising an α-olefin unit having 3 to 28 carbon atoms and an ethylene unit which accounts for 50% by mass or less.

The-olefin having 3 to 28 carbon atoms includes propylene, 1-butene, 1-pentene, 4-methylpentene-1,1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-icocene and the like.

The side chain of the graft copolymer is a polymerization chain having a mesopentad ratio [mmmm] of 30 to 80 mole %. The mesopentad ratio [mmmm] described above is preferably 30 to 75 mole %, more preferably 32 to 70 mole %.

If the mesopentad ratio is less than 30 mole %, the heat resistance and the mechanical properties are reduced, and if it exceeds 80 mole %, the molding processability and the impact strength are reduced. A mesopentad ratio of the side chain in the graft copolymer can be known from a stereoregularity of the reactive polyolefin used in producing it. Also, the stereoregularities of methyl, methane and methylene each originating in the reactive polyolefin of the graft copolymer can be determined by NMR analysis described later. Further, they can be determined as well by thermally decomposing the graft copolymer under nitrogen atmosphere and then obtaining fragments forming the side chain to measure them by NMR.

A graft rate of the graft copolymer is 1 to 150% by mass, preferably 2 to 130% by mass and more preferably 5 to 100% by mass. If the graft rate is less than 1% by mass, the graft copolymer is reduced in an affinity to the engineering plastic and liable to be degraded in a compatible ability, and if it exceeds 150% by mass, the graft copolymer is reduced in an affinity to the polyolefin and liable to be degraded in a compatible ability.

The graft rate of the graft copolymer is measured in the following manner.

The graft rate is calculated in the following manner from a mass ($W2$) of an insoluble graft copolymer component obtained by dissolving and removing a polymer of the monomer forming the main chain which does not participate in the graft copolymerization reaction and a soluble polymer component by a solvent and a mass ($W1$) of the reactive polyolefin used as the raw material:

$$\text{graft rate}(\% \text{ by mass}) = (W2-W1)/W1 \times 100$$

The solvent used has to dissolve the homopolymer or the copolymer comprising the monomer forming the main chain under dissolving conditions. Further, the solvent used has to show no solubility to the reactive polyolefin under the same dissolving conditions as described above. Showing no solubility means showing a dissolving amount of 1% by mass or less, and dissolving means that insoluble matters are not observed by visual observation of the solution.

A weight average molecular weight of the graft copolymer is 500 to 400000, preferably 700 to 350000, more preferably 1000 to 300000 and most preferably 1500 to 250000. If the weight average molecular weight is less than 500, the compatible performance is shown, but the properties of the composition are reduced. If it exceeds 400000, a melting moldability of the composition is reduced.

A molecular weight distribution (Mw/Mn) of the graft copolymer is 1.5 to 4, preferably 1.55 to 3 and more preferably 1.6 to 2.5. It is difficult to produce the graft copolymer having a molecular weight distribution of less than 1.5, and if the molecular weight distribution exceeds 4, the graft copolymer is scattered in a compatible performance, so that the fixed compatible performance is less liable to be obtained.

When a weight average molecular weight and a molecular weight distribution of the graft copolymer are determined, a gel permeation chromatography (GPC) method can be used in the following manner.

The molecular weight distribution (Mw/Mn) can be determined by measuring the weight average molecular weight (Mw) and the number average molecular weight (Mn) by means of the following equipment on the following conditions by a GPC method:

GPC measuring equipment:
Detector: RI detector for liquid chromatography, 150 C manufactured by Waters Corporation
Column: TOSO GMHHR-H(S) HT
Measuring conditions:
Solvent: 1,2,4-trichlorobenzene
Measuring temperature: 145° C.
Flow velocity: 1.0 ml/minute
Sample concentration: 0.3% by mass The weight average molecular weight (Mw) and the number average molecular weight (Mn) were determined by a Universal Calibration method using constants K and a of a Mark-Houwink-Sakurada equation in order to reduce a polystyrene-reduced molecular weight to a molecular weight of the corresponding polymer.

To be specific, they were determined by a method described in "Size Exclusion Chromatography, written by S. Mori, p. 67 to 69, 1992, Kyouritsu Shuppan".

K and α are described in "Polymer Handbook, John Wiley & Sons, Inc.".

Also, they can be determined from a relation of a limiting viscosity to a newly calculated absolute molecular weight by an ordinary method.

The graft copolymer has a limiting viscosity [η] of preferably 0.01 to 2.5 dl/g, more preferably 0.02 to 2.2 dl/g and further preferably 0.05 to 2.0 dl/g which is measured at 135° C. in decalin.

If the limiting viscosity [η] is 0.01 dl/g or more, the performances such as the resin solubility and the like are elevated, and if it is 2.5 dl/g or less, the dispersibility into resins is preferably enhanced.

Further, the graft copolymer preferably does not contain a gel component. A reduction in the gel component is achieved by using a reactive polyolefin which has a high amount of an end unsaturated group and which does not substantially contain a molecule having unsaturated groups at both ends to efficiently carry out graft copolymerization reaction.

Measuring Method for Gel Component:

A solvent which dissolves both of a main chain component of the graft copolymer and a side chain component thereof is used, and 50 mg of the graft copolymer is put in a cage made of a stainless-made net of 400 mesh (aperture: 0.034 mm) in a glass-made separable flask equipped with a stirring device. The cage is fixed on a stirring blade.

A solvent containing 0.1% by mass of an antioxidant (BHT) is put therein, and the polymer is dissolved under a boiling point for 4 hours while stirring.

After dissolved, the cage is recovered and dried sufficiently under vacuum, and an insoluble part is determined by weighing.

The gel component defined as the insoluble part is calculated according to the following equation:

((amount (g) remaining in mesh)/(amount (g) of sample charged))×100 (unit: %)

The solvent includes paraxylene, toluene and the like.

Usually, it is prescribed by a range of 0.1 to 1.5% by mass in the equation described above that the gel component is not contained therein.

Production Method for Graft Copolymer:

The graft copolymer can be produced by polymerizing the specific reactive olefin with the monomer forming the main chain.

Reactive Olefin for Side Chain:

The reactive polyolefin used in the present invention is preferably a reactive polyolefin which is a homopolymer of a single kind selected from α-olefins having 3 to 28 carbon atoms or a copolymer of two or more kinds selected therefrom or a copolymer of at least one monomer selected from α-olefins having 3 to 28 carbon atoms and ethylene, wherein a mesopentad ratio [mmmm] is 30 to 80 mole %, and an amount of an end unsaturated group per molecule is 0.5 to 1.0 group. The reactive polyolefin used in the present invention can be produced by satisfying the conditions described above.

The mesopentad ratio [mmmm] described above is preferably 30 to 75 mole %, more preferably 32 to 70 mole %.

In a case of the polymer comprising propylene as a principal component, a stereoregularity thereof is determined in the following manner.

The mesopentad ratio [mmmm] described above and a racemipentad ratio [rrrr] and a racemimesoracemimeso ratio [rmrm] each described later are a meso ratio, a racemi ratio and a racemimesoracemimeso ratio in a pentad unit in a polypropylene molecular chain measured by a signal of a methyl group in a $^{13}$C-NMR spectrum according to a method proposed by A. Zambelli et al. in "Macromolecules, 6, 925 (1973)".

If the mesopentad ratio [mmmm] grows larger, the stereoregularity is elevated.

A $^{13}$C-NMR spectrum can be measured on the following conditions by means of the following equipment according to assignment of peaks proposed by A. Zambelli et al. in "Macromolecules, 8, 687 (1975)".

A mesotriad ratio [mm], a racemitriad ratio [rr] and a mesoracemi ratio [mr] each described later are calculated according to the method described above.

Apparatus: JNM-EX400 type $^{13}$C-NMR apparatus manufactured by JEOL Ltd.
Method: proton complete decoupling method
Concentration: 220 mg/ml
Solvent: 90:10 (volume ratio) mixed solvent of 1,2,4-trichlorobenzene and heavy benzene
Temperature: 130° C.
Pulse duration: 45°
Pulse repeating time: 4 seconds
Integration: 10000 times <Calculating Equation>

$$M=(m/s)\times 100$$

$$R=(\gamma/s)\times 100$$

$$S=P\beta\beta+P\alpha\beta+P\alpha\gamma$$

S: signal intensity of side chain methyl carbon atom in whole propylene units
Pββ: 19.8 to 22.5 ppm
Pαβ: 18.0 to 17.5 ppm
Pαγ: 17.5 to 17.1 ppm
γ: racemipentad chain: 20.7 to 20.3 ppm
m: mesopentad chain: 21.7 to 22.5 ppm In a case of the polymer comprising polybutene as a principal component, a stereoregularity thereof is determined in the following manner.

The mesopentad ratio (mmmm) and the abnormal insertion content (1,4 insertion ratio) were determined according to methods proposed in "Polymer Journal, 16, 717 (1984)" reported by Asakura et al., "Macromol. Chem. Phys., C29, 201 (1989)" reported by J. Randall et al. and "Macromol. Chem. Phys., 198, 1257 (1989)" reported by V. Busico et al.

That is, signals of a methylene group and a methine group were measured by using a $^{13}$C nuclear magnetic resonance spectrum to determine a mesopentad ratio and an abnormal insertion content in a poly(1-butene) molecule.

The $^{13}$C nuclear magnetic resonance spectrum was measured on the conditions described above by means of the apparatus described above.

The stereoregularity index ((mmmm)/(mmrr+rmmr)) was calculated from a value obtained by measuring (mmmm), (mmrr) and (rmmr) according to the method described above.

Further, the racemitriad ratio [rr] can be calculated as well according to the method described above.

A stereoregularity index ((mmmm)/(mmrr+rmmr)) of the 1-butene homopolymer or copolymer is 20 or less, preferably 18 or less and more preferably 15 or less.

If the stereoregularity index exceeds 20, the flexibility is reduced.

In a case of the polymer comprising α-olefin having 5 or more carbon atoms as a principal component, a stereoregularity thereof is determined in the following manner.

The above stereoregularity index value $M_2$ was determined according to a method proposed in "Macromolecules, 24, 2334 (1991)" reported by T. Asakura, M. Demura and Y. Nishiyama.

That is, $M_2$ can be determined by making use of that $CH_2$ carbon at an α-position of the side chain which originates in higher α-olefin is observed in a split state reflecting a difference in a stereoregularity in the $^{13}$C-NMR spectrum.

In the present invention, above $M_2$ can be replaced by the mesopentad ratio (mmmm) described above.

It is shown that the higher the above value is, the higher the isotacticity is.

The apparatus and the conditions of the $^{13}$C nuclear magnetic resonance spectrum are the same as described above, and the stereoregularity index value $M_2$ is determined in the following manner.

Large six absorption peaks based on the mixed solvent are observed in 127 to 135 ppm. Among these peaks, a value of the fourth peak from a low magnetic field side is observed in 131.1 ppm, and it is set to a standard for chemical shift.

In the above case, absorption peaks based on $CH_2$ carbon at an α-position of the side chain are observed in the vicinity of 34 to 37 ppm.

In this regard, $M_2$ (mole %) is determined by using the following equation:

$$M_2 = ((\text{integrated intensity in 36.2 to 35.3 ppm})/(\text{integrated intensity in 36.2 to 34.5 ppm})) \times 100$$

The reactive polyolefin described above has 0.5 to 1.0 group, preferably 0.6 to 1.0 group, more preferably 0.7 to 1.0 group, more preferably 0.8 to 1.0 group, more preferably 0.82 to 1.0 group, further preferably 0.85 to 1.0 group and most preferably 0.90 to 1.0 group of an end unsaturated group.

If the end unsaturated group is 0.5 or more group, a concentration of the unsaturated group grows high, and a production efficiency of the graft copolymer is elevated.

The end unsaturated group is preferably a vinylidene group, and the vinylidene group accounts for usually 50 to 100 mole %, preferably 60 to 100 mole %, more preferably 70 to 100 mole % and further preferably 80 to 100 mole % based on the end unsaturated group.

The reactive polyolefin used in the present invention does not substantially contain a component having two or more unsaturated groups per molecule, for example, a component having unsaturated groups at both ends.

The component having two or more unsaturated groups per molecule acts as a so-called cross-linking agent, and therefore it forms a cross-linked structure (H type) in the graft copolymerization to by-produce a gel component, so that it is not preferred.

Accordingly, unsaturated polypropylene produced by thermal decomposition can not be used.

The unsaturated group described above is measured usually by using an infrared absorption spectral method, a nuclear magnetic resonance spectral method, a bromination method and the like, and it can be measured by any method.

The infrared absorption spectral method can be carried out according to a method described in "New Edition High Polymer Analysis Handbook, edited by Japan Society for Analytical Chemistry, High Polymer Analysis Research Seminar".

According thereto, unsaturated groups such as a vinyl group, a vinylidene group, a trans(vinylene) group and the like can be quantatively determined respectively from absorptions in 910 $cm^{-1}$, 888 $cm^{-1}$ and 963 $cm^{-1}$ of an infrared absorption spectrum in a method for determining an end unsaturated group by the infrared absorption spectral method.

A vinylidene unsaturated group is quantatively determined in the following manner by the nuclear magnetic resonance spectral method.

When the end unsaturated group is a vinylidene group, the number thereof is determined by measurement of $^1$H-NMR according to an ordinary method.

A content (C) (mole %) of the vinylidene group is calculated by an ordinary method based on the vinylidene group appearing in 54.8 to 4.6 (2H) which is obtained from measurement of $^1$H-NMR.

Further, the number of the vinylidene group per molecule is calculated from the number average molecular weight (Mn) determined by gel permeation chromatography (GPC) and the monomer molecular weight (M) according to the following equation:

$$\text{end vinylidene group (groups) per molecule} = (Mn/M) \times (C/100)$$

Also, an example of a method carried out by the nuclear magnetic resonance spectral method includes a method based on quantative determination of end groups. To be specific, it is a method in which end groups produced by polymerization reaction and contents thereof are measured by $^1$H-NMR and $^{13}$C-NMR to calculate the number of the end vinylidene groups per molecule from a presence proportion of the end vinylidene groups based on an amount of the whole end groups.

A case of the propylene polymer shall be shown as an example thereof.

Analysis of End Unsaturated Group by $^1$H-NMR:

[2] A methylene group (4.8 to 4.6 ppm) of a vinylidene group and [1] a methylene group (5.10 to 4.90 ppm) of a vinyl group are observed in the propylene polymer. A proportion thereof based on the whole propylene polymer can be calculated according to the following equation. Also, [3] corresponds to peak intensities corresponding to methane, methylene and methyl groups of a propylene chain (0.6 to 2.3 ppm).

$$\text{Amount } (A) \text{ of end vinylidene group} = ([2]/2)/[([3]+4\times[1]/2+3\times[2]/2)/6] \times 100 \text{ (unit: mole \%)}$$

$$\text{Amount } (B) \text{ of end vinyl group} = ([1]/2)/[([3]+4\times[1]/2+3\times[2]/2)/6] \times 100 \text{ (unit: mole \%)}$$

Analysis of End Ratio by $^{13}$C-NMR:

In the propylene polymer of the present invention, observed are [5] an end methyl group (in the vicinity of 14.5 ppm) at an end of n-propyl, [6] an end methyl group (in the vicinity of 14.0 ppm) at an end of n-butyl, [4] a methine group (in the vicinity of 25.9 ppm) at an end of iso-butyl and [7] a methylene group (in the vicinity of 111.7 ppm) at an end of vinylidene. A peak intensity of the end vinyl group amount measured by $^{13}$C-NMR was calculated in the following manner by using (A) and (B) determined in the $^1$H-NMR spectrum: peak intensity of the end vinyl group amount in $^{13}$C-NMR=(B)/(A)×[7]

in this regard, a whole concentration (T) of the end group is shown in the following manner:

$$T = (B)/(A) \times [7] + [4] + [5] + [6] + [7]$$

Accordingly, the proportions of the respective ends are:
(C) end vinylidene group=[7]/T×100 (unit: mole %)
(D) end vinyl group=(B)/(A)×[7]×100
(E) n-propyl end=[5]/T×100
(F) n-butyl end=[6]/T×100
(G) iso-butyl end=[4]/T×100

The number of the end vinylidene groups per molecule is 2×(C)/100 (unit: group/molecule).

The reactive polyolefin described above has a molecular weight distribution (Mw/Mn) of preferably 4 or less, more preferably 3.5 or less, more preferably 3 or less and further preferably 2.5 or less.

The narrower molecular weight distribution is more preferred. This is because of the reasons that in the graft copolymer used in the present invention, the reactive polyolefin forms chains, so that a side chain length (chain length) is less scattered and that the graft copolymer having a controlled structure is formed. The molecular weight distribution can be measured by making use of the method explained in the production of the graft copolymer described above.

The reactive polyolefin described above has a limiting viscosity [η] of 0.01 to 2.5 dl/g, preferably 0.05 to 2.5 dl/g, more preferably 0.05 to 2.0 dl/g, further preferably 0.1 to 2.0 dl/g and most preferably 0.15 to 1.8 dl/g which is measured at 135° C. in decalin.

If the limiting viscosity [η] falls in the ranges described above, a side chain length (chain length) of the graft copolymer is satisfactory, and the performances such as the compatibility and the like are exerted sufficiently. Further, a concentration of the end unsaturated group is high in the graft copolymerization, and therefore the radical polymerizability is elevated.

The limiting viscosity [η] is calculated by measuring a reduced viscosity ($\eta_{SP}/c$) in decalin of 135° C. by means of a Ubbelohde viscometer and using the following equation (Huggins equation):

$$\eta_{SP}/c = [\eta] + K[\eta]^2 c$$

$\eta_{SP}/c$ (dl/g): reduced viscosity
[η] (dl/g): limiting viscosity
c (g/dl): polymer concentration
K: 0.35 (Huggins constant)

The reactive polyolefin satisfies preferably the following equation:

racemimesoracemimeso ratio [rmrm]>2.5 mole %

If a racemimesoracemimeso ratio [rmrm] of the reactive polyolefin described above exceeds 2.5 mole %, the random property is increased, and the transparency is further enhanced.

In the reactive polyolefin, a melting point (Tm, unit: ° C.) observed by a differential scanning type colorimeter (DSC) and [mmmm] satisfy preferably the following relation:

$$1.76[mmmm] - 25.0 \leq Tm \leq 1.76[mmmm] + 5.0$$

The relational equation described above between the melting point (Tm, unit: ° C.) observed by the differential scanning type colorimeter (DSC) and [mmmm] shows a uniformity of a mesopentad ratio in the reactive polyolefin.

When the reactive polyolefin has a high uniformity of a stereoregularity, that is, when it has a narrow stereoregularity distribution, it shows that the graft copolymer has a high uniformity of a side chain, and a compatibility thereof with a polypropylene base resin is elevated. When the reactive polyolefin having a high mesopentad ratio and the reactive polyolefin having a low mesopentad ratio are present in a mixture and when they are block-combined, that is, when the stereoregularity distribution is broad, a compatibility thereof with a polypropylene base resin is reduced, and it is not preferred. The foregoing [mmmm] is measured in terms of an average value, and a case in which the stereoregularity distribution is broad can not clearly be distinguished from a case in which the stereoregularity distribution is narrow, but the preferred reactive propylene base copolymer having a high uniformity can be prescribed by limiting, as described above, relation of [mmmm] with a melting point (Tm) to a specific range.

When the melting point (Tm) exceeds (1.76[mmmm]+5.0), it shows that the part having a partially high stereoregularity and the part having no stereoregularity are present.

Also, when the melting point (Tm) does not reach (1.76[mmmm]−25.0), the heat resistance is unlikely to be sufficiently high.

From the viewpoint described above, the relational equation is preferably $$1.76[mmmm] - 20.0 \leq Tm \leq 1.76[mmmm] + 3.0$$

more preferably $$1.76[mmmm] - 15.0 \leq Tm \leq 1.76[mmmm] + 2.0$$

The melting point (Tm) described above is determined by DSC measurement.

A sample 10 mg was heated from 25° C. up to 220° C. at 320° C./minute under nitrogen atmosphere and held at 220° C. for 5 minutes, and then it was cooled down to 25° C. at 320° C./minute and held at 25° C. for 50 minutes. Then, it was heated from 25° C. up to 220° C. at 10° C./minute. A peak top in an endothermic peak observed at a highest temperature side of a melting heat absorbing curve detected in the above heating step was set to the melting point (Tm).

The reactive polyolefin further satisfies preferably the following prescription:

$$[rrrr]/(1-[mmmm]) \leq 0.1$$

If the relation described above is satisfied, the stickiness is inhibited.

$$[mm] \times [rr]/[mr]^2 \leq 2.0$$

If a value of $[mm] \times [rr]/[mr]^2$ is 2.0 or less, the transparency is inhibited from being reduced, and a balance between the flexibility and the elasticity recovering rate are improved. A value of $[mm] \times [rr]/[mr]^2$ falls in a range of preferably 1.8 to 0.5, more preferably 1.5 to 0.5.

20 ≦ component amount (W25) eluted at 25° C. or lower in a programmed temperature chromatography ≦ 100 (% by mass)

A component amount (W25) of the reactive polyolefin eluted at 25° C. or lower in the programmed temperature chromatography described above falls in a range of preferably 30 to 100% by mass, more preferably 50 to 100% by mass.

W25 is an index showing whether or not the reactive polyolefin is soft. If a value thereof is reduced, a component having a high elastic modulus is increased, and a nonuniformity of the mesopentad ratio (mmmm) is broadened.

In the reactive polyolefin described above, if W25 is 20% by mass or more, the flexibility is maintained.

W25 is an amount (% by mass) of a component eluted without being adsorbed onto a filler at a column temperature of 25° C. in TREF (programmed elution separation) in an elution curve measured and determined by programmed chromatography in an apparatus structure shown below on the following measuring conditions by the following operating method.

(1) Operating Method:

The sample solution is introduced into a TREF column controlled at a temperature of 135° C. and then slowly cooled down to 0° C. at a cooling rate of 5° C./hour, and it is held for 30 minutes to crystallize the sample on a filler surface. Then, the column is heated up to 135° C. at a heating rate of 40° C./hour to obtain an elution curve.

(2) Apparatus Structure:
TREF column: silica gel column (4.6φ×150 mm), manufactured by GL Science Corporation
Flow cell: optical path length: 1 mm, KBr cell, manufactured by GL Science Corporation
Liquid delivering pump: SSC-3100 pump, manufactured by Senshu Scientific Co., Ltd.
Valve oven: MODEL 554 oven (high temperature type), manufactured by GL Science Corporation
TREF oven: manufactured by GL Science Corporation
Dual system temperature controlling device: REX-C100 temperature controlling device, manufactured by Rigaku Kogyo Co., Ltd.
Detector: Infrared detector for liquid chromatography, MIRAN 1A CVF, manufactured by Foxboro Corporation
Ten-way valve: electric valve, manufactured by Balco Corporation
Loop: 500 μl loop, manufactured by Balco Corporation
(3) Measuring Conditions:
Solvent: o-dichlorobenzene
Sample concentration: 7.5 g/L
Injection amount: 500 μl
Pump flow amount: 2.0 ml/minute
Detection wave number: 3.41 μm
Column filler: Chromosolve P (30 to 60 mesh)
Column temperature distribution: ±0.2° C. or lower The reactive polyolefin is produced preferably by using a metallocene catalyst.

The metallocene catalyst includes catalysts which contain (A) a transition metal compound having a cyclopentadienyl group, a substituted cyclopentadienyl group, an indenyl group, a substituted indenyl group and the like and comprising a metal element of a 3rd to 10th group in the periodic table and (B) a compound capable of being reacted with the transition metal compound to form an ionic complex and which can form an end unsaturated group.

The transition metal compound includes compounds comprising a biscyclopentadienyl ligand such as zirconocene chloride, pentamethylcyclopentadienylzirconium dichloride and the like, compounds comprising a cross-linked indenyl ligand such as ethylenebisindenylzirconium dichloride, dimethylsilylene-bis-[2-methyl-4-phenylindenyl]zirconium dichloride, dimethylsilylene-bis-[2-methyl-4,5-benzoindenyl]zirconium dichloride and the like, compounds comprising a monocyclopentadienyl ligand such as pentamethylcyclopentadienyltrimethoxytitanium, pentamethylcyclopentadienyltrichlorotitanium and the like, compounds comprising an azulenium ligand such as dichloro[dimethylsilylene(cyclopentadienyl)(2,4-dimethyl-4H-1-azulenyl)]hafnium, dichloro[dimethylgermylene(cyclopentadienyl)(2,4-dimethyl-4H-1-azulenyl)]hafnium, dichloro[dimethylsilylene(2-methyl-1-indenyl)(2,4-dimethyl-4H-1-azulenyl)]hafnium and the like.

Further, the transition metal compound includes a double cross-liked transition metal compound represented by the following Formula (I):

[Ka 4]

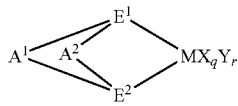

(I)

In Formula (I), M represents a metal element of a 3rd to 10th group in the periodic table, and a specific example thereof includes titanium, zirconium, hafnium, yttrium, vanadium, chromium, manganese, nickel, cobalt, palladium, lanthanoid base metals and the like.

Among them, titanium, zirconium and hafnium are suited from the viewpoint of an olefin polymerization activity, and zirconium is most suited from the viewpoint of a yield of an end vinylidene group and a catalyst activity.

$E^1$ and $E^2$ each represent a ligand selected from a cyclopentadienyl group, a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group (>CR—, >C<) and a silicon-containing group (>SiR—, >Si<) (provided that R is a hydrogen, a hydrocarbon group having 1 to 20 carbon atoms or a hetero atom-containing group), and they form a cross-linking structure via $A^1$ and $A^2$. $E^1$ and $E^2$ may be the same as or different from each other.

Above $E^1$ and $E^2$ are preferably a cyclopentadienyl group, a substituted cyclopentadienyl group, an indenyl group and a substituted indenyl group, and at least one of $E^1$ and $E^2$ is a cyclopentadienyl group, a substituted cyclopentadienyl group, an indenyl group or a substituted indenyl group.

X represents a δ-bonding ligand, and when a plurality of X is present, plural X may be the same or different and may be cross-linked with other X, $E^1$, $E^2$ or Y.

The specific examples of X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, an acyl group having 1 to 20 carbon atoms and the like.

The halogen atom includes a chlorine atom, a fluorine atom, a bromine atom and an iodine atom.

The hydrocarbon group having 1 to 20 carbon atoms includes, to be specific, alkyl groups such as methyl, ethyl, propyl, butyl, hexyl, cyclohexyl, octyl and the like; alkenyl groups such as vinyl, propenyl, cyclohexenyl 1 and the like; arylalkyl groups such as benzyl, phenylethyl, phenylpropyl and the like; aryl groups such as phenyl, tolyl, dimethylphenyl, trimethylphenyl, ethylphenyl, propylphenyl, biphenyl, naphthyl, methylnaphthyl, anthracenyl, phenanthrenyl and the like.

Among them, the alkyl groups such as methyl, ethyl, propyl and the like and the aryl groups such as phenyl and the like are preferred.

The alkoxy group having 1 to 20 carbon atoms includes alkoxy groups such as methoxy, ethoxy, propoxy, butoxy and the like, phenylmethoxy, phenylethoxy and the like.

The aryloxy group having 6 to 20 carbon atoms includes phenoxy, methylphenoxy, dimethylphenoxy and the like.

The amide group having 1 to 20 carbon atoms includes alkylamide groups such as dimethylamide, diethylamide, dipropylamide, dibutylamide, dicyclohexylamide, methylethylamide and the like, alkenylamide groups such as divinylamide, dipropenylamide, dicyclohexenylamide and the like; arylalkylamide groups such as dibenzylamide, phenylethylamide, phenylpropylamide and the like; arylamide groups such as diphenylamide, dinaphthylamide and the like.

The silicon-containing group having 1 to 20 carbon atoms includes hydrocarbon-monosubstituted silyl groups such as methylsilyl, phenylsilyl and the like; hydrocarbon-disubstituted silyl groups such as dimethylsilyl, diphenylsilyl and the like; hydrocarbon-trisubstituted silyl groups such as trimethylsilyl, triethylsilyl, tripropylsilyl, tricyclohexylsilyl, triphenylsilyl, trinaphthylsilyl and the like; hydrocarbon-substituted silyl ether groups such as trimethylsilyl ether and the like; silicon-substituted alkyl groups such as trimethylsilylmethyl and the like; silicon-substituted alkyl groups such as trimethylsilylphenyl and the like.

Among them, trimethylsilylmethyl, phenyldimethylsilylethyl and the like are preferred.

The phosphide group having 1 to 20 carbon atoms includes dialkyl phosphide groups such as dimethyl phosphide, diethyl phosphide, dipropyl phosphide, dibutyl phosphide, dihexyl phosphide, dicyclohexyl phosphide, dioctyl phosphide and the like; diaryl phosphide groups such as dibenzyl phosphide, diphenyl phosphide, dinaphthyl phosphide and the like.

The sulfide group having 1 to 20 carbon atoms includes alkyl sulfide groups such as methyl sulfide, ethyl sulfide, propyl sulfide, butyl sulfide, hexyl sulfide, cyclohexyl sulfide, octyl sulfide and the like; alkenyl sulfide groups such as vinyl sulfide, propenyl sulfide, cyclohexenyl sulfide and the like; arylalkyl sulfide groups such as benzyl sulfide, phenylethyl sulfide, phenylpropyl sulfide and the like; aryl sulfide groups such as phenyl sulfide, tolyl sulfide, dimethylphenyl sulfide, trimethylphenyl sulfide, ethylphenyl sulfide, propylphenyl sulfide, biphenyl sulfide, naphthyl sulfide, methylnaphthyl sulfide, anthracenyl sulfide, phenanthrenyl sulfide and the like.

The acyl group having 1 to 20 carbon atoms includes alkyl acyl groups such as formyl, acetyl, propionyl, butyryl, valeryl, palmitoyl, stearoyl, oleoyl and the like, aryl acyl groups such as benzoyl, toluoyl, salkyloyl, cynnamoyl, naphthoyl, phthaloyl and the like and oxalyl, malonyl, succinyl and the like which are derived respectively from dicarboxylic acids such as oxalic acid, malonic acid, succinic acid and the like.

On the other hand, Y represents a Lewis base, and when a plurality of Y is present, plural Y may be the same or different and may be cross-linked with other Y, $E^1$, $E^2$ or X.

The specific examples of above Y include amines, ethers, phosphines, thioethers and the like.

The amines include amines having 1 to 20 carbon atoms, and they include, to be specific, alkylamines such as methylamine, ethylamine, propylamine, butylamine, cyclohexylamine, methylethylamine, dimethylamine, diethylamine, dipropylamine, dibutylamine, dicyclohexylamine, methylethylamine and the like; alkenylamines such as vinylamine, propenylamine, cyclohexenylamine, divinylamine, dipropenylamine, dicyclohexenylamine and the like; arylalkylamines such as phenylamine, phenylethylamine, phenylpropylamine and the like; arylamines such as diphenylamine, dinaphthylamine and the like.

The ethers include aliphatic single ether compounds such as methyl ether, ethyl ether, propyl ether, isopropyl ether, butyl ether, isobutyl ether, n-amyl ether, isoamyl ether and the like; aliphatic mixed ether compounds such as methyl ethyl ether, methyl propyl ether, methyl isopropyl ether, methyl n-amyl ether, methyl isoamyl ether, ethyl propyl ether, ethyl isopropyl ether, ethyl butyl ether, ethyl isobutyl ether, ethyl n-amyl ether, ethyl isoamyl ether and the like; aliphatic unsaturated ether compounds such as vinyl ether, allyl ether, methyl vinyl ether, methyl allyl ether, ethyl vinyl ether, ethyl allyl ether and the like; aromatic ether compounds such as anisole, phenetole, phenyl ether, benzyl ether, phenyl benzyl ether, α-naphthyl ether, β-naphthyl ether and the like; cyclic ether compounds such as ethylene oxide, propylene oxide, trimethylene oxide, tetrahydrofuran, tetrahydropyran, dioxane and the like.

The phosphines include phosphines having 1 to 20 carbon atoms.

To be specific, they include alkylphosphines including hydrocarbon-monosubstituted phosphines such as methylphosphine, ethylphosphine, propylphosphine, butylphosphine, hexylphosphine, cyclohexylphosphine, octylphosphine and the like; hydrocarbon-disubstituted phosphines such as dimethylphosphine, diethylphosphine, dipropylphosphine, dibutylphosphine, dihexylphosphine, dicyclohexylphosphine, dioctylphosphine and the like; hydrocarbon-trisubstituted phosphines such as trimethylphosphine, triethylphosphine, tripropylphosphine, tributylphosphine, trihexylphosphine, tricyclohexylphosphine, trioctylphosphine and the like; monoalkenylphosphines such as vinylphosphine, propenylphosphine, cyclohexenylphosphine and the like and dialkenylphosphines obtained by substituting hydrogen atoms of phosphines with two alkenyls; trialkenylphosphines obtained by substituting hydrogen atoms of phosphines with three alkenyls; arylphosphines including arylalkylphosphines such as benzylphosphine, phenylethylphosphine, phenylpropylphosphine and the like; diarylalkylphosphines or aryldialkylphosphines obtained by substituting hydrogen atoms of phosphines with three aryls or alkenyls; phenylphosphine, tolylphosphine, dimethylphenylphosphine, trimethylphenylphosphine, ethylphenylphosphine, propylphenylphosphine, biphenylphosphine, naphthylphosphine, methylnaphthylphosphine, anthracenylphosphine, phenanthrenylphosphine; di(alkylaryl)phosphines obtained by substituting hydrogen atoms of phosphines with two alkylaryls; and tri(alkylaryl)phosphines obtained by substituting hydrogen atoms of phosphines with three alkylaryls. The thioethers include the sulfides described above.

Next, $A^1$ and $A^2$ are divalent cross-linking groups which bond two ligands and represent a hydrocarbon group having 1 to 20 carbon atoms, a halogen-containing hydrocarbon group having 1 to 20 carbon atoms, a silicon-containing group, a germanium-containing group, a tin-containing group, $-O-$, $-CO-$, $-S-$, $-SO_2-$, $-Se-$, $-NR^1-$, $-PR^1-$, $-P(O)R^1-$, $-BR^1-$ or $-AlR^1-$, and $R^1$ represents a hydrogen atom, a halogen atom, a hydrocarbon group having 1 to 20 carbon atoms or a halogen-containing hydrocarbon group having 1 to 20 carbon atoms; they may be the same as or different from each other; q is an integer of 1 to 5 and represents [(valence of M)-2), and r represents an integer of 0 to 3.

Among the above cross-linking groups, at least one of them is preferably a cross-linking group comprising a hydrocarbon group having 1 or more carbon atoms.

The above cross-linking group includes, for example, a group represented by Formula (a):

[Ka 5]

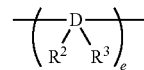

(a)

(D is an element of a 14th group in the periodic table and includes, for example, carbon, silicon, germanium and tin; $R^2$ and $R^3$ each are a hydrogen atom or a hydrocarbon group having 1 to 20 carbon atoms, and they may be the same as or different from each other and may be combined with each other to form a ring structure; and e represents an integer of 1 to 4).

The specific examples thereof include methylene, ethylene, ethylidene, propylidene, isopropylidene, cyclohexylidene, 1,2-cyclohexylene, vinylidene ($CH_2=C=$), dimethylsilylene, diphenylsilylene, methylphenylsilylene, dimethylgermylene, dimethylstanylene, tetramethyldisilylene, diphenyldisilylene and the like. Among them, ethylene, isopropylidene and dimethylsilylene are suited.

The specific examples of the double cross-linked transition metal compound represented by Formula (I) include (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2 μl' isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-isopropylcyclopentadienyl)(3'-methyl-5'-isopropylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyl)zirconium dichloride, (1,2'-dimethylsilylene) (2,1'-ethylene) (3-methyl-5-n-butylcyclopentadienyl) (3'-methyl-5'-n-butylcyclopentadienyl) zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene) (2,1'-methylene) (3-methyl-5-n-butylcyclopentadienyl) (3'-methyl-5'-n-butylcyclopentadienyl) zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropylidene)(3-methyl-5-isopropylcyclopentadienyl)(3'-methyl-5'-isopropylcyclopentadienyl)zirconium dichloride, (1,2'-methylene)(2,1'-methylene)(3-methyl-5-isopropylcyclopentadienyl)(3'-methyl-5'-isopropylcyclopentadienyl)zirconium dichloride, (1,2'-methylen)(2,1'-isopropylidene)(3-methyl-5-isopropylcyclopentadienyl)(3'-methyl-5'-isopropylcyclopentadienyl)zirconium dichloride and the like. Further, it includes compounds obtained by substituting zirconium in the above compounds with titanium or hafnium and compounds represented by Formula (II) which shall be described later.

Also, they may be similar compounds of metal elements of the other groups.

They are preferably the transition metal compounds of the 4th group in the periodic table, and among them, they are preferably the compounds of zirconium.

Among the transition metal compounds represented by Formula (I), a compound represented by Formula (II) is preferred:

[Ka 6]

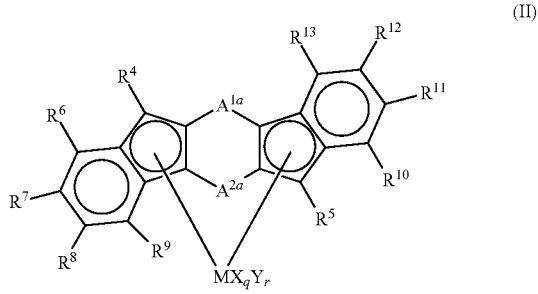

(II)

In Formula (II) described above, M represents a metal element of a 3rd to 10th group in the periodic table; $A^{1a}$ and $A^{2a}$ each represent the cross-linking group represented by Formula (a) in Formula (I) described above, and they are preferably $CH_2$, $CH_2CH_2$, $(CH_3)_2C$, $(CH_3)_2C(CH_3)_2C$, $(CH_3)_2Si$ and $(C_6H_5)_2Si$.

$A^{1a}$ and $A^{2a}$ may be the same as or different from each other.

$R^4$ to $R^{13}$ each represent a hydrogen atom, a halogen atom, a hydrocarbon group having 1 to 20 carbon atoms, a halogen-containing hydrocarbon group having 1 to 20 carbon atoms, a silicon-containing group or a hetero atom-containing group.

The halogen atom, the hydrocarbon group having 1 to 20 carbon atoms and the silicon-containing group include the same ones as explained in Formula (I) described above.

The halogen-containing hydrocarbon group having 1 to 20 carbon atoms includes p-fluorophenyl, 3,5-difluorophenyl, 3,4,5-trifluorophenyl, pentafluorophenyl, 3,5-bis(trifluoro)phenyl, fluorobutyl and the like.

The hetero atom-containing group includes hetero atom-containing groups having 1 to 20 carbon atoms and, it includes, to be specific, nitrogen-containing groups such as dimethylamino, diethylamino, diphenylamino and the like; sulfur-containing groups such as phenyl sulfide, methyl sulfide and the like; phosphorus-containing groups such as dimethylphosphino, diphenylphosphino and the like; and oxygen-containing groups such as methoxy, ethoxy, phenoxy and the like.

Among them, groups containing hetero atoms such as halogen, oxygen and silicon are preferred as $R^4$ and $R^5$ since the polymerization activity is enhanced.

A hydrogen atom or the hydrocarbon group having 1 to 20 carbon atoms is preferred as $R^4$ to $R^{13}$.

X and Y are the same as in Formula (I). The term q is an integer of 1 to 5 and represents [(valence of M)-2], and r represents an integer of 0 to 3).

When both indenyl groups are the same in the double cross-linked transition metal compounds represented by Formula (II) described above, the transition metal compounds of the 4th group in the periodic table include (1,2'-dimethylsilylene)(2,1'-dimethylsilylene)bis(indenyl)zirconium dichloride, (1,2'-dimethylsilylene)(2,1'-dimethylsilylene)bis(3-methylindenyl)zirconium dichloride, (1,2'-dimethylsilylene)(2,1'-dimethylsilylene)bis(3-ethylindenyl)zirconium dichloride, (1,2'-dimethylsilylene)(2,1'-dimethylsilylene)bis(3-isopropylindenyl)zirconium dichloride, (1,2'-dimethylsilylene)(2,1'-dimethylsilylene)bis(3-trimethylsilylmethylindenyl)zirconium dichloride, (1,2'-dimethylsilylene)(2,1'-dimethylsilylene)bis(3-butylindenyl)zirconium dichloride, (1,2'-dimethylsilylene)(2,1'-dimethylsilylene)bis(4-methylindenyl)zirconium dichloride, (1,2'-dimethylsilylene)(2,1'-dimethylsilylene)bis(4,7-dimethylindenyl)zirconium dichloride, (1,2'-dimethylsilylene)(2,1'-dimethylsilylene)bis(5,6-dimethylindenyl)zirconium dichloride, (1,2'-dimethylsilylene)(2,1'-dimethylsilylene)bis(3-ethoxymethylindenyl)zirconium dichloride, (1,2'-dimethylsilylene)(2,1'-dimethylsilylene)bis(3-ethoxyethylindenyl)zirconium dichloride, (1,2'-dimethylsilylene)(2,1'-dimethylsilylene)bis(3-methoxymethylindenyl)zirconium dichloride, (1,2'-dimethylsilylene)(2,1'-dimethylsilylene)bis(3-methoxyethylindenyl)zirconium dichloride, (1,2'-phenylmethylsilylene)(2,1'-phenylmethylsilylene)bis(indenyl)zirconium dichloride, (1,2'-phenylmethylsilylene)(2,1'-phenylmethylsilylene)bis(3-methylindenyl)zirconium dichloride, (1,2'-dimethylsilylene)(2,1'-isopropylidene)bis(indenyl)zirconium dichloride, (1,2'-dimethylsilylene)(2,1'-isopropylidene)bis(3-methylindenyl)zirconium dichloride, (1,2'-dimethylsilylene)(2,1'-isopropylidene)bis(3-isopropylindenyl)zirconium dichloride, (1,2'-dimethylsilylene)(2,1'-isopropylidene)bis(3-n-butylindenyl)zirconium dichloride, (1,2'-dimethylsilylene)(2,1'-isopropylidene)bis(3-trimethylsilylmethylindenyl)zirconium dichloride, (1,2'-dimethylsilylene)(2,1'-isopropylidene)bis(3-trimethylsilylindenyl)zirconium dichloride, (1,2'-dimethylsilylene)(2,1'-isopropylidene)bis(3-phenylindenyl)zirconium dichloride, (1,2'-dimethylsilylene)(2,1'-methylene)bis(indenyl)zirconium dichloride, (1,2'-dimethylsilylene)(2,1'-methylene)bis(3-methylindenyl)zirconium dichloride, (1,2'-dimethylsilylene)(2,1'-methylene)bis(3-isopropylindenyl)zirconium dichloride, (1,2'-dimethylsilylene)(2,1'-methylene)bis(3-n-butylindenyl)zirconium dichloride, (1,2'-dimethylsilylene)(2,1'-methylene)bis(3-trimethylsilylmethylindenyl)zirconium dichloride, (1,2'-dimethylsilylene)(2,1'-methylene)bis(3-trimethylsilylindenyl)zirconium dichloride, (1,2'-diphenylsilylene)(2,1'-methylene)bis(indenyl)zirconium dichloride, (1,2'-diphenylsilylene)(2,1'-methylene)bis(3-methylindenyl)zirconium dichloride, (1,2'-diphenylsilylene)(2,1'-methylene)bis(3-n-butylindenyl)zirconium dichloride, (1,2'-diphenylsilylene)(2,1'-methylene)bis(3-trimethylsilylmethylindenyl)zirconium dichloride, (1,2'-diphenylsilylene)(2,1'-methylene)bis(3-trimethylsilylindenyl)zirconium dichloride and the like. Further, they include compounds obtained by substituting zirconium in the above compounds with titanium or hafnium, but they shall not be restricted to the above compounds.

Also, they may be similar compounds of metal elements of the other groups than the 4th group.

They are preferably the transition metal compounds of the 4th group in the periodic table, and among them, they are preferably the compounds of zirconium.

On the other hand, in a case in which $R^5$ is a hydrogen atom and in which $R^4$ is not a hydrogen atom in the double cross-linked transition metal compounds represented by Formula (II) described above, the transition metal compounds of the 4th group in the periodic table include (1,2'-dimethylsilylene)(2,1'-dimethylsilylene)(indenyl)(3-trimethylsilylmethylindenyl)zirconium dichloride, (1,2'-dimethylsilylene)(2,1'-dimethylsilylene)(indenyl)(3-methylindenyl)zirconium dichloride, (1,2'-dimethylsilylene)(2,1'-dimethylsilylene)(indenyl)(3-trimethylsilylindenyl)zirconium dichloride, (1,2'-dimethylsilylene)(2,1'-dimethylsilylene)(indenyl)(3-phenylindenyl)zirconium dichloride, (1,2'-dimethylsilylene)(2,1'-dimethylsilylene)(indenyl)(3-benzylindenyl)zirconium dichloride, (1,2'-dimethylsilylene)(2,1'-dimethylsilylene)(indenyl)(3-neopentylindenyl)zirconium dichloride, (1,2'-dimethylsilylene)(2,1'-dimethylsilylene)(indenyl)(3-phenetylindenyl)zirconium dichloride, (1,2'-ethylene)(2,1'-ethylene)(indenyl)(3-trimethylsilylmethylindenyl)zirconium dichloride, (1,2'-ethylene)(2,1'-ethylene)(indenyl)(3-methylindenyl)zirconium dichloride, (1,2'-ethylene)(2,1'-ethylene)(indenyl)(3-trimethylsilylindenyl)zirconium dichloride, (1,2'-ethylene)(2,1'-ethylene)(indenyl)(3-phenylindenyl)zirconium dichloride, (1,2'-ethylene)(2,1'-ethylene)(indenyl)(3-benzylindenyl)zirconium dichloride, (1,2'-ethylene)(2,1'-ethylene)(indenyl)(3-neopentylindenyl)zirconium dichloride, (1,2'-ethylene)(2,1'-ethylene)(indenyl)(3-phenethylindenyl)zirconium dichloride and the like. Further, they include compounds obtained by substituting zirconium in the above compounds with titanium or hafnium, but they shall not be restricted to the above compounds.

Also, they may be similar compounds of metal elements of the other groups than the 4th group.

They are preferably the transition metal compounds of the 4th group in the periodic table, and among them, they are preferably the compounds of zirconium.

The compound (B) which can be reacted with the transition metal compound constituting the catalyst used in the present invention to form an ionic complex is preferably a borate compound from the viewpoints that a high purity end-unsaturated olefin base polymer having a relatively low molecular weight is obtained and that the catalyst is provided with a high activity.

The borate compound includes triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridium tetraphenylborate, benzylpyridinium tetraphenylborate, methyl(2-cyanopyridium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridium tetrakis(pentafluorophenyl)borate, benzylpyridium tetrakis(pentafluorophenyl)borate, methyl(2-cyanopyridium) tetrakis(pentafluorophenyl)borate, benzyl(2-cyanopyridium) tetrakis(pentafluorophenyl)borate, methyl(4-cyanopyridium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, triphenylcarbenium tetrakis(pentafluorophenyl)borate, methylanilinium tetrakis(perfluorophenyl)borate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrakis(pentafluorophenyl)borate and the like. They can be used alone or in combination of two or more kinds thereof. When a mole ratio (hydrogen/transition metal compound) of hydrogen to the transition metal compound is 0 as described later, preferred are dimethylanilium tetrakis(pentafluorophenyl)borate, triphenylcarbenium tetrakis(pentafluorophenyl)borate and methylanilium tetrakis(perfluorophenyl)borate.

The catalyst used in the production process of the present invention may comprise combination of the component (A) and the component (B) each described above or may be prepared by using an organic aluminum compound as a component (C) in addition to the component (A) and the component (B).

The organic aluminum compound of the component (C) includes trimethylaluminium, triethylaluminium, triisopropylaluminium, triisobutylaluminium, tri-n-hexylaluminium, tri-noctylaluminium, dimethylaluminium chloride, diethylaluminium chloride, methylaluminium dichloride, ethylaluminium dichloride, dimethylaluminium fluoride, diisobutylaluminium hydride, diethylaluminium hydride, ethylaluminium sesquichloride and the like.

The above organic aluminum compounds may be used alone or in combination of two or more kinds thereof.

Among them, preferred in the present invention are trialkylaluminiums such as trimethylaluminium, triethylaluminium, triisopropylaluminium, triisobutylaluminium, tri-nhexylaluminium and tri-n-octylaluminium, and triisobutylaluminium, tri-n-hexylaluminium and tri-n-octylaluminium are more preferred.

A use amount of the component (A) is usually $0.1 \times 10^{-6}$ to $1.5 \times 10^{-5}$ mole/L, preferably $0.15 \times 10^{-6}$ to $1.3 \times 10^{-5}$ mole/L, more preferably $0.2 \times 10^{-6}$ to $1.2 \times 10^{-5}$ mole/L and particularly preferably $0.3 \times 10^{-6}$ to $1.0 \times 10^{-5}$ mole/L.

If a use amount of the component (A) is $0.1 \times 10^{-6}$ mole/L or more, the catalyst activity is sufficiently exerted, and if it is $1.5 \times 10^{-5}$ mole/L or less, polymerization heat can readily be removed.

A use proportion (A)/(B) of the component (A) to the component (B) is preferably 10/1 to 1/100, more preferably 2/1 to 1/10 in terms of a mole ratio.

If (A)/(B) falls in a range of 10/1 to 1/100, not only an effect of the catalyst is obtained, but also the catalyst cost per a unit mass of the polymer can be controlled. Also, a large amount of boron is not likely to be present in the targeted reactive polyolefin.

A use proportion (A)/(C) of the component (A) to the component (C) is preferably 1/1 to 1/10000, more preferably 1/5 to 1/2000 and further preferably 1/10 to 1/1000 in terms of a mole ratio.

Use of the component (C) makes it possible to enhance the polymerization activity per the transition metal. If (A)/(C) falls in a range of 1/1 to 1/10000, a balance between an addition effect of the component (C) and the economical efficiency is good, and a large amount of aluminum is not likely to be present in the targeted reactive polyolefin.

In the production process of the present invention, preliminary contact can be carried out as well by using the component (A) and the component (B) or the component (A), the component (B) and the component (C).

The preliminary contact can be carried out by bringing, for example, the component (A) into contact with the component (B). However, a method therefor shall not specifically be restricted, and publicly known methods can be used.

The above preliminary contact enhances the catalyst activity and reduces a use proportion of the component (B) which is a promoter, so that it is effective for reducing the catalyst cost.

The reactive polyolefin of the present invention is preferably reduced in the catalyst residue described above. In particular, a content of transition metals is 5 ppm by mass or less; a content of aluminum is 300 ppm by mass or less; and a content of boron is 5 ppm by mass or less.

The transition metals include titanium, zirconium, hafnium and the like, and a total amount of them is 5 ppm by mass or less.

A content of aluminum is preferably 280 ppm by mass or less.

The above metal components can be measured by means of an ICP (high frequency induction coupling plasma spectroscopic analysis) measuring equipment.

Use of the reactive polyolefin having less catalyst residue provides the resulting graft copolymer with a high purity and therefore is preferred.

Monomer for Main Chain:

The main chain of the graft copolymer used in the present invention contains 1 to 100% by mass of the monomer unit having a functional group interacting with the engineering plastic. The above main chain can be formed by carrying out polymerization reaction using a monomer containing the functional group described above.

In general, monomers having a functional group are different in a reactivity to a large extent according to the functional group present. Accordingly, a suitable monomer or combination of monomers is preferably used in order to produce the graft copolymer having a main chain provided with desired properties and a desired length in the present invention, and when dibasic acid compounds such as maleic acid and the like are used as the monomer, they are used preferably in the following specific combination.

When dibasic acid compounds are not used, preferred is a monomer represented by Formula (III):

[Ka 7]

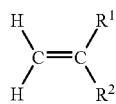
(III)

(wherein $R^1$ represents a hydrogen atom, a halogen atom or a hydrocarbon group having 1 to 12 carbon atoms; the hydrocarbon group having 1 to 12 carbon atoms includes an alkyl group, an aryl group, an aralkyl group and an arylalkyl group; $R^2$ is a group represented by any of Formulas (IV) to (VII):

[Ka 8]

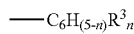
(IV)

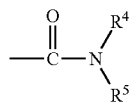
(V)

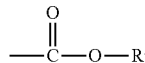
(VI)

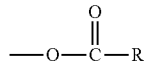
(VII)

$R^3$ represents a hydrogen atom, a hydrocarbon group having 1 to 12 carbon atoms or a hydrocarbon group having 1 to 12 carbon atoms which contains any atom of an oxygen atom, a nitrogen atom and a silicon atom; $R^4$ represents a hydrogen atom or a hydrocarbon group having 1 to 12 carbon atoms; $R^5$ represents a hydrogen atom, a hydrocarbon group having 1 to 12 carbon atoms or a hydrocarbon group having 1 to 12 carbon atoms which has any group of an epoxy group, an amino group, an isocyanate group, a hydroxyl group and a carboxyl group; and n is an integer of 0 to 5).

At least one of them can be used to carry out polymerization.

In particular, monomers having any functional group of a hydroxyl group, an epoxy group, an amino group, an isocyanate group and a carboxyl group are preferred since a covalent bond can be formed with the engineering plastic.

The specific examples of the monomer include the following compounds [I] to [IV].

[I] Acrylic acid and derivatives thereof:
(1) Acrylic acid,
(2) acrylic esters such as methyl acrylate, ethyl acrylate, butyl acrylate, normal octyl acrylate, 2-ethylhexyl acrylate and the like; and long chain polyalkylene type glycols having a molecular weight of 30000 or less, such as polyethylene glycol monoacrylate, polyethylene glycol polypropylene glycol acrylate, poly(ethylene glycol-n-tetramethylene glycol) monoacrylate, propylene glycol polybutylene glycol monoacrylate, polypropylene glycol monoacrylate and the like,
(3) metal acrylates comprising acrylic acid and typical metal elements, such as sodium acrylate, potassium acrylate, magnesium acrylate, calcium acrylate and the like,
(4) acrylic esters containing oxygen, nitrogen, sulfur and silicon atoms in an ester residue, for example, acrylic esters having a functional group, such as glycidyl acrylate, 2-hydroxyethyl acrylate, 2-hydroxypropyl acrylate, 2-hydroxy-3-phenoxypropyl acrylate, 4-hydroxybutyl acrylate, acryloyloxyethyl isocyanate, methacryloyloxyethyl isocyanate, 3-acryloxypropyltrimethoxysilane, 2-(2-methacryloyloxyethyloxy)ethyl isocyanate, 3-acryloxypropyltriethoxysilane and the like; long chain polyalkylene glycols having a hydroxyl group which have a molecular weight of 30000 or less, such as polyethylene glycol monoacrylate, polyethylene glycol polypropylene glycol acrylate, poly(ethylene glycol-n-tetramethylene glycol) monoacrylate, propylene glycol polybutylene glycol monoacrylate, polypropylene glycol monoacrylate and the like; mixtures of acrylic esters containing a hydroxyl group with polyvalent isocyanate compounds, for example, 2-hydroxyethyl acrylate, 2-hydroxypropyl acrylate, 2-hydroxy-3-phenoxypropyl acrylate and 4-hydroxybutyl acrylate as the acrylic esters containing a hydroxyl group and phenylene diisocyanate, isophorone diisocyanate, 4,4'-methylenebisphenyl isocyanate and 4,4'-methylenebiscyclohexyl isocyanate as the polyvalent isocyanate compounds,
(5) acrylamides,
(6) N-substituted acrylamides containing oxygen, nitrogen, sulfur and silicon atoms in a substituent, for example, N-substituted acrylamides such as N-methylacrylamide, N-ethylacrylamide, N-isopropylacrylamide, N-cyclohexylacrylamide, N,N-dimethylacrylamide, N,N-diethylacrylamide, N,N-dibutylacrylamide, N,N-dicyclohexylacrylamide, N-(2-hydroxyethyl)-acrylamide, N-(2-hydroxypropyl)-acrylamide, N,N-dimethylaminoethylacrylamide, 00N-methylolacrylamide and the like and
(7) acrylonitrile.

[II] Methacrylic acid and α-alkyl-substituted products of acrylic acid (hereinafter, they shall be abbreviated together as "methacrylic acids") and derivatives thereof:
Monomers having an alkyl group (preferably an alkyl group having 6 or less carbon atoms) such as methyl and the like in an a-position of the monomers of [I] described above.

[III] Vinyl esters and derivatives thereof or alkoxyvinylsilanes, for example, vinyl acetate, vinyl propionate, vinyl isobutyrate, vinyl pivalate, vinyl undecanoate, vinyl palmitate and the like and derivatives thereof; and alkoxyvinylsilanes such as trimethoxyvinylsilane, triethoxyvinylsilane and the like.

[IV] Styrene and derivatives thereof including styrene, alkylstyrenes such as α-methylstyrene, p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene and the like; alkoxystyrenes such as p-methoxystyrene, o-methoxystyrene, m-methoxystyrene and the like; halogenated styrenes such as p-chlorostyrene, m-chlorostyrene, o-bromostyrene, p-fluorostyrene, m-fluorostyrene, o-fluorostyrene, o-methyl-p-fluorostyrene and the like; trimethylsilylstyrene and vinyl acetate.

Among the compounds described above, the monomers having any functional group of a hydroxyl group, an epoxy group, an amino group, an isocyanate group and a carboxyl group are preferred since a covalent bond can be formed with the engineering plastic.

The preferred monomers and the preferred combinations of the monomers include the following ones.

All the compounds described above are preferred as [I] acrylic acid and the derivatives thereof, and all the compounds excluding the metal acrylates are particularly preferred.

The graft polymerization can be carried out only with [II] methacrylic acid and the derivatives thereof, but combining [I] acrylic acid and the derivatives thereof with [II] methacrylic acid and the derivatives thereof allows a graft polymerization amount of [II] methacrylic acid and the derivatives thereof to be elevated, and therefore it is preferred.

In particular, combination of acrylic acid and acrylic esters with methacrylic acid and methacrylic esters is preferred.

A preferred mole ratio of [I] acrylic acid and the derivatives thereof to [II] methacrylic acid and the derivatives thereof falls in a range of 0.1 to 2, preferably 0.2 to 1.5, more preferably 0.3 to 1.2 and further preferably 0.5 to 1.0 in terms of [I]/[II] (mole ratio).

If [I]/[II] (mole ratio) is 0.1 or more, a graft polymerization amount of [II] methacrylic acid and the derivatives thereof is elevated, and if it is 2 or less, a copolymer comprising [I] acrylic acid and the derivatives thereof and [II] methacrylic acid and the derivatives thereof which do not participate in the graft polymerization is not by-produced. Accordingly, both are preferred.

Also, the graft polymerization can be carried out only with styrene and the derivatives thereof, but combining [I] acrylic acid and the derivatives thereof with [II] methacrylic acid and the derivatives thereof allows a graft polymerization amount of styrene and the derivatives thereof to be elevated, and therefore it is preferred.

In particular, combination of acrylic acid and acrylic esters with styrene and the derivatives thereof is preferred.

A preferred mole ratio of [I] acrylic acid and the derivatives thereof to [VI] styrene and the derivatives thereof falls in a range of 0.1 to 2, preferably 0.2 to 1.5, more preferably 0.3 to 1.2 and further preferably 0.5 to 1.0 in terms of [I]/[VI] (mole ratio).

If [I]/[VI] (mole ratio) is 0.1 or more, a graft polymerization amount of [VI] styrene and the derivatives thereof is elevated, and if it is 2 or less, a copolymer comprising [I] acrylic acid and the derivatives thereof and [VI] styrene and the derivatives thereof which do not participate in the graft polymerization is not by-produced. Accordingly, both are preferred.

When the dibasic acid compound is used, monomers of at least one selected from the following group A and at least one selected from the following group B are preferably used in combination Group A:
[V] Maleic anhydride and substitution products thereof
[VI] Maleic acid and esters thereof
[VII] Maleimide and substitution products thereof.

Group B:
[I] Acrylic acid and derivatives thereof:
[II] Methacrylic acid and derivatives thereof:
[III] Vinyl esters and derivatives thereof or alkoxyvinylsilanes
[IV] Styrene and derivatives thereof
[VIII] α-Olefins The compounds shown in [I], [II], [III] and [IV] are described below.

That is,
[V] maleic anhydride and substitution products thereof such as maleic anhydride, methylmaleic anhydride, dimethylmaleic anhydride, phenylmaleic anhydride, diphenylmaleic anhydride and the like,
[VI] maleic acid and esters thereof such as maleic acid, methylmaleic acid, dimethyl maleate, diethyl maleate, dibutyl maleate, monomethyl maleate and the like,
[VII] maleimide and substitution products thereof such as maleimide, N-alkyl-substituted maleimide, N-methylmaleimide, N-ethylmaleimide, N-phenylmaleimide and the like,
[VIII] α-olefins having 2 to 28 carbon atoms such as ethylene, propylene, 1-butene, 1-hexene, 1-heptene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene and the like.

The monomers of the group A described above have a small electron density of a double bond, and therefore the monomers of the same kind are less liable to be polymerized. Accordingly, in the present invention, a content of the monomer in the group A is elevated by polymerizing it in combination with the monomer of the group B. Also, in the present invention, use of the monomer in the group A makes it possible to enhance a reactivity of the reactive polyolefin, and therefore the effect that the graft copolymer can effectively be produced can be obtained as well.

Further, [VIII] the α-olefin having 2 to 28 carbon atoms is selected considering relation between the graft polymerization temperature and a boiling point thereof.

In melt graft polymerization, the higher the temperature is, the easier the handling is in terms of operating the reaction if the α-olefin having a high boiling point is used.

Further, in the graft polymerization carried out by using a solvent, not only the gaseous α-olefins but also the α-olefins having a high boiling point can be used.

Among the monomers of the group A described above, maleic anhydride is preferred. Among the monomers of the group B described above, the monomers having any functional group of a hydroxyl group, an epoxy group, an amino group, an isocyanate group and a carboxyl group are more preferred.

In combination of the compound of the group A and the compound of the group B, the compound of the group A/the compound of the group B (mole ratio) falls in a range of 0.1 to 2, preferably 0.5 to 1.5, more preferably 0.8 to 1.2 and further preferably 0.9 to 1.1.

If the mole ratio is 0.1 or more, a graft polymerization amount of the compound of the group A elevated, and if it is 2 or less, a copolymer comprising the compound of the group A and the compound of the group B which do not participate in the graft polymerization is not by-produced. Accordingly, both are preferred.

The combination of the compounds of the group A and the group B is preferably combination comprising [V] maleic anhydride and the substitution products thereof in the group A and the compounds of the group B, and it is more preferably combination of [V] maleic anhydride and the substitution products thereof in the group A with [I] acrylic acid and the derivatives thereof, [III] the vinyl esters and the derivatives thereof or alkoxyvinylsilanes and [VIII] the α-olefins in the group B.

The radical initiator used in the graft copolymerization of the present invention shall not specifically be restricted, and radical initiators which have so far been publicly known, for example, compounds suitably selected from various organic peroxides, azo base compounds and the like can be used. Both compounds are suitable radical initiators.

The organic peroxides include, for example, diacylperoxides such as dibenzoylperoxide, di-8,5,5-trimethylhexanoylperoxide, dilauroylperoxide, didecanoylperoxide, di(2,4-dichlorobenzoyl)peroxide and the like, hydroperoxides such as t-butylhydroperoxide, cumenhydroperoxide, diisopropylbenzenehydroperoxide, 2,5-dimethylhexane-2,5-dihydroperoxide and the like, dialkylperoxides such as di-t-butylperoxide, dicumylperoxide, 2,5-dimethyl-2-5-di(t-butylperoxy)hexane, 2,5-dimethyl-2,5-di(t-butylperoxy)hexyne-3,α,α'bis(t-butylperoxy)diisopropylbenzene and the like, peroxyketals such as 1,1-bis-t-butylperoxy-3,3,5-trimethylcyclohexane, 2,2-bis(t-butylperoxy)butane and the like, alkylperesters such as t-butylperoxyoctoate, t-butylperoxypivalate, t-butylperoxyneodecanoate, t-butylperoxybenzoate and the like, peroxycarbonates such as di-2-ethylhexylperoxydicabonate, diisopropylperoxydicarbonate, di-sec-butylperoxydicarbonate, t-butylperoxyisopropyl carbonate and the like. Among them, the dialkylperoxides are preferred.

The azo base compounds include azobisisobutyronitrile, azobisisovaleronitrile and the like.

The radical initiators may be used alone or in combination of two or more kinds thereof.

A use amount of the radical initiator in the graft copolymerization reaction shall not specifically be restricted and is suitably selected according to the desired physical properties of the graft copolymer or the thermoplastic resin composition containing the above graft copolymer.

The radical initiator is used in a range of 0.001 to 10 parts by mass, preferably 0.005 to 5 parts by mass based on 100 parts by mass of the reactive polyolefin.

A use amount of the monomer for forming the main chain described above can suitably be determined according to the purposes, and it is selected in a range of 0.2 to 300 parts by mass based on 100 parts by mass of the reactive polyolefin. A use amount thereof falls in a range of preferably 1 to 250 parts by mass, more preferably 5 to 200 parts by mass and further preferably 10 to 180 parts by mass. If the use amount is 0.2 part by mass or more, an amount of the monomer copolymerized in the graft copolymer is elevated, and the performances such as the compatibility and the like are liable to be exerted. If it is 300 parts by mass or less, a polymer which does not participate in the graft polymerization is not by-produced. Accordingly, both are preferred.

The graft polymerization method shall not specifically be restricted, and the graft polymer can be produced, for example, by melting and kneading the reactive polyolefin, the monomers and the radical initiator each described above by means of a roll mill, a Banbury mixer, an extruding equipment or the like to react them. The reaction conditions include a temperature of 60 to 140° C. and a time of 0.01 to 0.5 hour.

Further, the graft polymer can be produced in a hydrocarbon base solvent such as butane, pentane, hexane, cyclohexane, toluene and the like, a halogenated hydrocarbon base solvent such as chlorobenzene, dichlorobenzene, trichlorobenzene and the like and a suitable organic solvent such as liquefied α-olefin and the like or on a condition of the absence of a solvent. The reaction conditions include a temperature of 40 to 140° C., preferably 50 to 140° C. and more preferably 50 to 100° C. and a time of 0.1 to 10 hours.

When the graft polymerization is carried out on a high temperature condition usually used, a molecular weight and a viscosity of the reactive polyolefin are liable to be reduced by decomposition thereof, and gel is liable to be produced by cross-linking reaction. In the conditions described above, however, the temperature is relatively low, and the molecular weight and the viscosity are not reduced. Side reactions such as cross-linking reaction are controlled as well.

The graft polymerization of the present invention may be carried out under the presence of a Lewis acid, and the Lewis acid includes the following compounds.

(1) Halides (chlorine, bromine, fluorine and iodine), alkylated compounds (hydrocarbon groups having 1 to 20 carbon atoms) and halogenated alkylated compounds of 2nd to 4th group elements in the periodic table.

(2) Lewis acids comprising aluminum, boron, zinc, tin, magnesium and calcium atoms.

The specific examples of the Lewis acids include magnesium chloride, calcium chloride, zinc chloride, boron trichloride, aluminum trichloride, gallium trichloride, silicon tetrachloride and compounds obtained by substituting chlorine atoms of the above compounds with bromine atoms and fluorine atoms, butylethylmagnesium, diethylzinc, trimethylaluminum, triethylaluminum, triisobutylaluminum, tri-n-hexylaluminum, trimethylboron, triethylboron, triethylgallium, trimethylgallium, diethylaluminum monochloride, ethylaluminum dichloride and ethylaluminum sesquichloride and the like. Among them, the zinc compounds, the aluminum compounds and the boron compounds are preferred.

A use amount of the Lewis acid in the graft polymerization reaction is 0.01 to 1, preferably 0.05 to 1 and more preferably 0.1 to 0.5 in terms of the Lewis acid/the monomer (mole/mole). In this connection, the monomer described above means the compound represented by Formula (III) or the monomer selected from the monomers [I] to [VIII] each explained as the monomer for the main chain.

If the Lewis acid/the monomer (mole/mole) is 0.01 or more, the graft rate grows high, and if it is 1 or less, a residue of the Lewis acid is not required to be removed by deashing, so that it is preferred because of the reason that coloring is prevented.

The Lewis acid is added before adding the radical initiator to carry out the graft polymerization reaction or the Lewis acid which is brought in advance into contact with the monomers [I] to [VIII] is used to thereby carry out the graft polymerization reaction.

Engineering Plastic:

An engineering plastic having a functional group (functional group II) interacting with the functional group I described above is used as the engineering plastic used in the present invention. End functional groups in the engineering plastic and functional groups obtained by being subjected to modification treatment can be used as the functional group II.

The engineering plastic includes polyamide, polyacetal, polycarbonate, polyesters, polyphenylene ethers, syndiotactic polystyrene, polyphenylene sulfide and the like. They shall specifically be explained below.

Polyamide:

Polyamide is a polymer having an amide bond in a main chain and has usually an amino group and a carboxyl group at an end of a main chain, and they function as end functional groups. A content of the amino group and the carboxyl group is reduced in a certain case by adding a molecular weight controlling agent, monocarboxylic acid or the like, but the engineering plastic can be reacted with the graft copolymer to form a covalent bond as long as it has the above groups. A concentration of the amino group or the carboxyl group is preferably 10 millimole/kg, more preferably 30 millimole/kg or more. In quantitative determination of the amino group and the carboxyl group, a method described at page 704 of "New Edition High Polymer Analytical Handbook" edited by The Chemical Society of Japan, High Polymer Analytical Research Council.

A number average molecular weight of the polyamide is preferably 5,000 to 100,000, more preferably 10,000 to 30,000. Also, an index of the molecular weight shown by a melt index falls in a range of 0.5 to 200 g/10 minutes in terms of a value measured at a decided temperature of 230 to 275° C. according to ASTM 1238G.

The specific examples of the polyamide includes polyamide 6, polyamide 66, polyamide 46, polyamide 11, polyamide 12, polyamide 610, polyamide 612, polyamide 6/66, polyamide 6/612, polyamide MXD6 (MXD: m-xylylenediamine), polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 66/12/6T, polyamide 6/12/6I, polyamide 66/12/6I and the like.

The functional group I reacted with the polyamide is preferably a carboxyl group, a hydroxyl group, a maleic anhydride residue, an isocyanate group and an epoxy group which are functional groups reacted with an end carboxyl group or an end amino group of the polyamide, and a maleic anhydride residue, an isocyanate group and an epoxy group which are reacted with the end amino group are more preferred.

Further, the affinity can be enhanced as well by a hydrogen bond and an electrostatic interaction making use of an amide group of the polyamide.

Polyacetal:

Polyacetal is a homopolymer of formaldehyde and a copolymer comprising trioxane as a principal monomer and ethylene oxide, 1,3-dioxolane and the like as a copolymerization monomer, and it is a compound having an ether group. Usually, the copolymer has a hydroxyethyl end, and it functions as an end functional group. On the other hand, some of the homopolymers are blocked at an end thereof by acetylation, and the homopolymer which is not subjected to acetylation can suitably be used. A concentration of the end hydroxyl group is preferably 10 millimole/kg or more, more preferably 30 millimole/kg or more. In quantitative determination of the hydroxyl group, a method described in Polym. Eng. Sci., 30, 1056 (1990).

The polyacetal has a melt index of 0.1 to 1000 g/10 minutes, preferably 0.2 to 500 g/10 minutes (ASTM D1238G, 190° C.).

The functional group I reacted with the polyacetal is preferably an isocyanate group, an epoxy group, a maleic anhydride residue and a carboxyl group which are functional groups reacted with an end hydroxyl group of the polyacetal.

Polycarbonate:

Polycarbonate is a compound having a carbonic ester bond in a main chain, and an end of the main chain is usually a phenol end, a chloroformate end, a phenyl group end or a t-butylphenol end. Among them, polycarbonate having a phenol end can preferably be used. The phenol end is preferably 0.2 to 2 ends per molecule. The phenol end can quantitatively be determined by an NMR method, a potentiometric titration method and a UV ray absorption method, and a method described in, for example, Macromol. Chem., 88, 215 (1965) J. Appl. Polym. Sci., Appl. Polm. Symp., 34, 103 (1978) can be used.

A preferred molecular weight of the polyamide is 10000 to 100000 in terms of a viscosity average molecular weight (Mv). If it is less than 10000, the preferred physical properties are not sufficiently exerted, and if it exceeds 100000, the melt fluidity is reduced. Accordingly, both are not preferred. The viscosity average molecular weight (Mv) can be determined according to the following relational equation by measuring the limiting viscosity [η] at 20° C. in a methylene chloride solvent:

$$[\eta]=1.23\times10^{-5}\,\mathrm{Mv}^{0.832}$$

Usually, a polycarbonate having a viscosity average molecular weight (Mv) of exceeding 50000 is reduced in a melt fluidity, but a resin composition thereof with polyolefin such as polypropylene and the like is excellent in a melt fluidity and shows a high chemical stability such as a high chemical resistance, and therefore it is preferred. In a case of the composition comprising polycarbonate and polypropylene, the composition comprising about 15 parts by mass of polypropylene based on 100 parts by mass of polycarbonate is improved in a melt fluidity, and the composition comprising 20 to 40 parts by mass of polypropylene is notably improved in a chemical resistance in addition to a melt fluidity.

The functional group I reacted with the polycarbonate is preferably an epoxy group, an isocyanate group, a maleic anhydride residue and a carboxyl group which are functional groups reacted with a phenol end of the polycarbonate, and an epoxy group and an isocyanate group are particularly preferred.

Further, the affinity can be enhanced as well by a hydrogen bond, an electrostatic interaction and a stacking interaction making use of a phenol ring, a carbonate group and the like.

Polyester:

Polyester is a polymer obtained by polycondensation reaction of dicarboxylic acid with diol and usually has a hydroxyl group and a carboxyl group at ends, and they function as an end functional group. A concentration of the hydroxyl group or the carboxyl group is preferably 10 millimole/kg, more preferably 30 millimole/kg or more. The carboxyl group can be quantitatively determined by dissolving the polyester in a solvent and then titrating the solution by a standard alkali-.benzyl alcohol solution, and methods described in, for example, Anal. Chem., 26, 1614 (1954) and Acta Polymer, 30, 598 (1979) can be used. Also, the hydroxyl group can be measured by quantitative determination of the acetylated end by a fluorescent X ray method, and a method described in, for example, Anal. Chem., 293, 396 (1978) can be used.

Usually, the polyester has a molecular weight of 10000 to 100000, and the polyester having a molecular weight falling in the above range can be used. The molecular weight can be prescribed by a value measured by using a relational equation of a polybutylene terephthalate molecular weight. In the measuring method, the molecular weight is calculated according to relation of the limiting viscosity [η] measured at a temperature of 20° C. in a mixed phenol solution used as a solvent with the molecular weight (Mw):

$$[\eta]=1.29\times10^{-4}\times\mathrm{Mw}^{0.871}$$

Alternatively, the polyester, which is assumed to be molten at a melting temperature falling in a range of 220 to 270° C., can be used.

The polyester includes reaction products of dicarboxylic acids and diols each shown below.

The dicarboxylic acids include terephthalic acid, isophthalic acid, o-phthalic acid, 2,6-naphthalenedicarboxylic acid, p-phenylenedicarboxylic acid, 1,4-cyclohexanedicarboxylic acid, succinic acid, adipic acid, azelaic acid, sebacic acid, sodium sulfoisophthalate and the like. The diols include ethylene glycol, propylene glycol, 1,4-butanediol, 1,6-hexanediol, neopentyl glycol, diethylene glycol, triethylene glycol, polyethylene glycol, polytetramethylene glycol, 1,4-cyclohexanedimethanol, bisphenol A and the like.

To be more specific, the polyester includes polyethylene terephthalate and polybutylene terephthalate.

The functional group I reacted with the polyester is preferably an isocyanate group, an epoxy group, a maleic anhydride residue and a carboxyl group which are functional groups reacted with an end hydroxyl group or an end carboxyl group of the polyester.

Further, the affinity can be enhanced as well by a hydrogen bond and an electrostatic interaction making use of an ester group of the polyester.

Polyphenylene Ether:

The polyphenylene ether is a polymer having a structure represented by Formula (VIII):

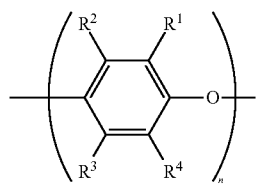

(VIII)

In Formula (VIII), $R^1$ and $R^4$ each represent independently a hydrogen atom, a halogen atom, a primary or secondary lower alkyl group, a phenyl group, a haloalkyl group, an aminoalkyl group, a hydrocarbonoxy group or a halohydrocarbonoxy group; $R^2$ and $R^3$ each represent independently a hydrogen atom, a halogen atom, a primary or secondary lower alkyl group, a phenyl group, a haloalkyl group, a hydrocarbonoxy group or a halohydrocarbonoxy group.

The polyphenylene ether having a phenolic hydroxyl group at an end is preferably used. A concentration of the hydroxyl group is preferably 10 millimole/kg or more, more preferably 30 millimole/kg or more. The method explained in the polycarbonate can be used for a quantitative determination method of the hydroxyl group.

The polyphenylene ether has a reducing viscosity (0.5 g/dl, measured at 30° C. in a chloroform solution) falling in a range of preferably 0.15 to 0.70, further preferably 0.20 to 0.60 and more preferably 0.40 to 0.55.

The specific examples of the polyphenylene ether include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether) and the like, and they further include copolymers of 2,6-dimethylphenol with other phenols (for example, 2,3,6-trimethylphenol and 2-methyl-6-butylphenol). Further, alloys of the polyphenylene ether with other resins (for example, polystyrene, polyamide and the like) can be used as well.

The functional group I reacted with the polyphenylene ether is preferably an epoxy group, an isocyanate group, a maleic anhydride residue and a carboxyl group which are functional groups reacted with a phenol end of the polyphenylene ether, and an epoxy group and an isocyanate group are particularly preferred.

Syndiotactic Polystyrene:

The syndiotactic polystyrene used in the present invention is crystalline polystyrene which is produced by stereospecific polymerization of a styrene monomer and which has a stereoregular index [rrrr] of 80 mole % or more, preferably 90 mole % or more and a maximum melting point of 270° C. A homopolymer of styrene and a copolymer of styrene with alkyl-substituted styrene such as p-methylstyrene can be used.

The molecular weight falls in a range of usually 500000 to 800000, and polystyrene falling in the above range can be used. The above molecular weight shows a polystyrene-reduced weight average molecular weight measured by a GPC method.

Usually, syndiotactic polystyrene does not have a functional group, and therefore modified syndiotactic polystyrene described later is preferably used. Alternatively, interaction which acts affinitively through a space by using styrene and p-methylstyrene as a monomer forming a main chain of the graft copolymer is preferably used.

Polyphenylene Sulfide:

The polyphenylene sulfide used in the present invention is a polymer represented by a structure obtained by substituting an oxygen atom in the main chain represented by Formula (VIII) described above with a sulfur atom. $R^1$, $R^2$, $R^3$ and $R^4$ are the same as in Formula (VIII).

A process in which p-dichlorobenzene (PDCB) is subjected to polycondensation reaction with NaSH/NaOH or $Na_2S$ in N-methylpyrrolidone (NMP) under high temperature and pressure is usually carried out as a production process for the polyphenylene sulfide.

The above polymer includes a cross-linked type and a straight chain type, and both types can be used. The straight chain type is linear and has a sufficiently elevated molecular weight, and the cross-linked type includes a type produced by forming a branched bond by cross-linking reaction of the straight chain type in heating or a type produced by introducing a branched structure in polycondensation reaction by subjecting a multifunctional monomer to copolycondensation.

The polymer in which $R^1$, $R^2$, $R^3$ and $R^4$ are hydrogen atoms is preferred.

The molecular weight is usually 20,000 to 80,000, and the polymer having a molecular weight falling in the above range can be used. In this connection, the prescribed molecular weight is determined according to the following relational equation:

$$[\eta]=8.91\times10^{-5}\times Mw^{0.747}$$

and measured based on a method described in J. of Applied Polymer Science, 32, p. 3959 to 3969 (1986).

It has become clear that not only —Cl or —SNa but also an N-alkylpyridine group which is assumed to be produced by decomposition and bonding of NMP as a polymerization solvent, a pyridine group or the like is present as a component for an end group. Further, the polymer is washed with a hydrochloric acid aqueous solution to readily turn —SNa at a polymer end into —SH.

The functional group I reacted with polyphenylene sulfides includes functional groups reacted with a —SNa group and a —SH group, and it is preferably a functional group reacted with a thiophenol end (—SH) of the polyphenylene sulfide. It is preferably an epoxy group, an isocyanate group, a maleic anhydride residue and a carboxyl group, and it is particularly preferably an epoxy group and an isocyanate group.

The other engineering plastics include the following ones. Amorphous polyallylates: whole aromatic polyesters of dihydric phenol and aromatic dicarboxylic acids, and the specific examples thereof include amorphous polyallylates comprising mixed phthalic acid of terephthalic acid and isophthalic acid and bisphenol.

Liquid crystal polyesters: thermotropic polyesters showing a liquid crystallinity in a molten state, and the specific examples thereof include liquid crystal polyesters comprising p-hydroxybenzoic acid and polyethylene terephthalate, liquid crystal polyesters comprising p-hydroxybenzoic acid and 2,6-hydroxynaphthoic acid and the like.

Polyether ketones: aromatic polyether ketones having an ether bond and a ketone bond, and the specific examples thereof include polyether ketone (PEK), polyetherether ketone (PEEK), polyether ketone ketone (PEKK), polyether etherketone ketone (PEEKK) and the like.

When an amount of an end functional group of the engineering plastic is short and when a functional group which is richer in a reactivity is required, a modified product of the engineering plastic can be used.

The preferred functional group includes a carboxyl group, a maleic anhydride residue, an epoxy group, a hydroxyl group, an amino group, an isocyanate group and the like. A production process for the modified product includes a process in which the engineering plastic is reacted with a modifying agent having the functional group described above and a carbon-carbon unsaturated bond under the presence of a radical initiator to thereby carry out modification treatment, and melting reaction, solution reaction and reaction in a solvent dispersion state can be applied thereto.

Resin Composition Containing a Resin Component Prepared by Blending the Graft Copolymer and the Engineering Plastic:

A resin composition containing a resin component prepared by blending the graft copolymer and the engineering plastic (hereinafter abbreviated as the resin composition of the present invention) shows a composition containing a graft copolymer and an engineering plastic and a composition containing a reaction product of a graft copolymer and an engineering plastic in addition to the above products.

The resin composition of the present invention is changed preferably in a blending amount thereof according to the purposes. Modification of a surface of the molded matter, improvement in the physical properties of the molded matter and production of the master batch shall be explained below separately.

Modification of a Surface of the Molded Matter:

Use of the resin composition of the present invention modifies a surface of the molded matter and enhances a die releasing property, a coating property and an adhesive property thereof. That is, the graft copolymer comes out onto an interface between the molded matter and the die in injection molding to form a thin film. As a result thereof, the molded matter is improved in a die releasing property, and the molding cycle can be shortened. Further, staining of the die is reduced to make it easy to maintain the die. Also, polar sites are allowed to be present on a surface of the molded matter to enhance an adhesive property and a coating property of the surface.

When the purpose is to modify the surface of the molded matter, a blending ratio of the graft copolymer to the engineering plastic is 10 to 5000 parts by mass, preferably 15 to 4000 parts by mass and most preferably 20 to 3000 parts by mass of the engineering plastic based on 1 part by mass of the graft copolymer. If it falls in the ranges described above, a modifying effect on the surface of the molded matter can be obtained without changing characteristics which the engineering plastic is endowed with to a large extent.

Improvement in the Physical Properties of the Molded Matter:

Use of the resin composition of the present invention makes it possible to improve the melt fluidity, the impact resistance, the heating and cooling impact (heat shock), the hygroscopicity and the hydrolysis resistance.

When the purpose is to improve the physical properties of the molded matter, a blending ratio of the graft copolymer to the engineering plastic is usually 1 to 1000 parts by mass, preferably 2 to 500 parts by mass and most preferably 2 to 100 parts by mass of the engineering plastic based on 1 part by mass of the graft copolymer. If it falls in the ranges described above, the targeted effect for improving the physical properties can be obtained.

Production of Master Batch:

The resin composition of the present invention can be used as the master batch.

When it is used as the master batch, a blending ratio of the graft copolymer to the engineering plastic falls in a range of usually 1 to 20 parts by mass of the engineering plastic based on 1 part by mass of the graft copolymer, and a mole ratio of the functional group forming a covalent bond is used preferably in a range of 0.5 to 2.0 functional groups in the engineering plastic based on 1 functional group in the graft copolymer.

A production process for the resin composition of the present invention includes heating, melting and kneading methods by a single shaft extruding equipment, a double shaft extruding equipment, a roll, a kneader, a brabender plastograph, a Banbury mixer and the like, and among them, a melting and kneading method carried out by means of a double shaft extruding equipment is most preferred. In respect to the production conditions, the composition is molten and kneaded usually at a temperature which is higher by about 10° C. than a melting point thereof. Accordingly, the reaction temperature falls in a range of preferably 180 to 350° C. when the engineering plastic is polyamide, preferably 180 to 250° C. when it is polyacetal, preferably 200 to 310° C. when it is polycarbonate, preferably 230 to 300° C. when it is polyester and preferably 220 to 310° C. when it is polyphenylene ether. The reaction time can optionally be selected in a range of 1 to 60 minutes.

A method other than melting and kneading includes a method in which the components are mixed in a solvent in a dissolved or finely dispersed state. In this case, the temperature is preferably 40 to 200° C., and the time is preferably 1 minute to 5 hours.

The resin composition of the present invention may contain polyolefin in addition to the resin component obtained by blending the graft copolymer and the engineering plastic. Addition of the polyolefin makes it possible to further improve the physical properties of the engineering plastic.

The polyolefin includes homopolymers of ethylene, propylene and butene or ethylene, propylene and butene base copolymers comprising at least one comonomer selected from α-olefins having 2 to 10 carbon atoms.

To be more specific, it includes the following ones.

Polyethylene: high density polyethylene and high pressure process low density polyethylene, ethylene/α-olefin copolymers: linear low density polyethylene (L-LDPE) such as ethylene/propylene copolymers, ethylene/butene copolymers, ethylene/hexene copolymers, ethylene/octene copolymers and the like, polyolefin base rubbers (EPDM) such as ethylene/propylene/diene copolymers and the like, polypropylene: atactic polypropylene, isotactic polypropylene, syndiotactic polypropylene and block polypropylene, polypropylene copolymers: copolymerized polypropylene comprising copolymer components of ethylene, butene, hexane, octene and the like, ethylene/polar monomer copolymers: ethylene/vinyl acetate copolymers and saponified products thereof, ethylene/ acrylic acid copolymers, ethylene/methyl methacrylate copolymers, ethylene/glycidyl methacrylate copolymers and the like, polybutene: isotactic polybutene, low to middle isotactic polybutene having a mesopentad ratio [mmmm] of 30 to 90 mole % and the like, higher poly-α-olefins obtained from α-olefins having 16 to 28 carbon atoms.

Among the polyolefins described above, polypropylene base resins having a weight average molecular weight of 10000 to 500000 are preferred, and low to high crystalline polypropylenes are more preferred. Low to high isotactic polypropylenes in which a propylene chain has a stereoregularity (mesopentad ratio [mmmm]) of 40 to 99 mole % are particularly preferred. To be specific, they include homopolypropylenes, random polypropylenes containing 20% by weight or more of ethylene and block polypropylenes.

A blending amount of the polyolefin in producing the resin composition containing the polyolefin is usually 2 to 50 parts by mass of the polyolefin and 0.005 to 20 parts by mass of the graft copolymer based on 100 parts by mass of the engineering plastic, preferably 5 to 45 parts by mass of the polyolefin and 0.01 to 15 parts by mass of the graft copolymer based on 100 parts by mass of the engineering plastic, more preferably 10 to 40 parts by mass of the polyolefin and 0.1 to 15 parts by mass of the graft copolymer based on 100 parts by mass of the engineering plastic and most preferably 15 to 35 parts by mass of the polyolefin and 0.5 to 10 parts by mass of the graft copolymer based on 100 parts by mass of the engineering plastic.

If the polyolefin falls in the ranges described above, the physical properties can be improved without damaging the advantages of the engineering plastic such as a heat resistance and the like. Also, if the graft copolymer falls in the ranges described above, the engineering plastic and the polyolefin are improved in a dispersibility, and an increase in a diameter of the particles dispersed and the performances such as the composition properties (the rigidity, the elongation and the like), the gas barrier property and the like can be prevented from being reduced.

A production process for the foregoing composition containing the polyolefin includes a process in which the resin component obtained by blending the graft copolymer and the engineering plastic is used as the master batch and in which it is molten and kneaded with the polyolefin, a process in which the composition of the graft copolymer and the polyolefin is used as the master batch and in which it is molten and kneaded with the engineering plastic and a process in which the graft copolymer, the polyolefin and the engineering plastic are dry-blended, molten and kneaded.

The production conditions of the foregoing composition containing the polyolefin include production conditions described below.

The melting method includes a batch system and a continuous system carried out by an extrusion kneading equipment, and the temperature which is not lower than a glass transition temperature or a melting point of the engineering plastic having a high heat resistance can be used. The kneading time is set preferably longer when reaction with the ends of the graft copolymer and the engineering plastic is brought about. The above melting method, temperature and kneading time include, to be specific, the conditions described in the production process for the resin composition containing the resin component obtained by blending the graft copolymer and the engineering plastic each described above.

In producing the foregoing composition containing the polyolefin, a catalyst can be used in order to expedite the reaction as long as a stability of the product is not damaged. Publicly known catalysts for esterification, transesterification, epoxidation and turning into urethane can be used for the catalyst.

The resin composition of the present invention can be blended with additives according to the purposes, and they include, for example, flow property improving agents and weld strength improving agents, such as fillers, fibers, nucleating agents, antioxidants, hydrochloric acid absorbing agents, heat resistant stabilizers, light stabilizers, UV absorbers, lubricants, antistatic agents, flame retardants, pigments, dyes, dispersants, copper inhibitors, neutralizing agents, foaming agents, plasticizers, bubble inhibitors, cross-linking agents, peroxides and the like.

The resin composition of the present invention can be used for producing the targeted molded matters for various applications by various molding methods such as an injection molding method, an extrusion molding method (a method for producing films, sheets, fibers and the like by molding), a hollow molding method, a vacuum molding method, a press molding method, a foaming molding method and the like.

The examples of the molded matters prepared by using the resin composition of the present invention include exterior members such as door mirror stays, door trims, wheel caps, roof rails and the like, interior and exterior parts for automobiles such as console boxes, door interior materials, roof materials, flooring materials and the like, car-related members such as intake manifolds, connectors and the like, home electric appliance & OA instrument-related parts such as housings for personal computers, connectors, base materials for liquid crystal panels and the like, machinery parts such as gears, pulleys, rods and the like, vessels such as bottles, trays and the like, films such as laminate films. Stretched films, evaporated films and the like, sheets and the like.

EXAMPLES

Next, the present invention shall be explained in further details with reference to examples, but the present invention shall by no means be restricted by these examples.

Production Example 1

Production of Reactive Polypropylene (1) Synthesis of Metal Complex (1,2'-Dimethylsilylene)(2,1'-dimethylsilylene)-(indenyl) (3-trimethylsilylmethylindenyl)zirconium dichloride was synthesized in the following manner.

A Schlenk bottle of 200 ml was charged with 50 ml of ether and 3.5 g (10.2 mmol) of (1,2'-dimethylsilylene)(2,1'-dimethylsilylene)bisindene under nitrogen flow, and a hexane solution (1.60 mole/liter, 12.8 ml) of n-butyllithium (n-BuLi) was dropwise added thereto at −78° C. The mixture was stirred at room temperature for 8 hours, and then the solvent was removed by distillation, followed by drying the resulting solid matter under reduced pressure, whereby 5.0 g of a white solid matter was obtained. This solid matter was dissolved in 50 ml of tetrahydrofuran (THF), and 1.4 ml of iodomethyltrimethylsilane was dropwise added thereto at room temperature. Hydrolysis was carried out by adding 10 ml of water, and the organic phase was extracted with 50 ml of ether. Then, the organic phase was dried, and the solvent was removed by distillation. Ether 50 ml was added thereto, and a hexane solution (1.60 mole/liter, 12.4 ml) of n-BuLi was dropwise added thereto at −78° C. Then, the solution was heated up to room temperature and stirred for 3 hours, and then ether was removed by distillation. The resulting solid matter was washed with 30 ml of hexane and then dried under reduced pressure. The above white solid matter 5.11 g was dispersed in 50 ml of toluene, and 2.0 g (8.60 mmol) of zirconium tetrachloride dispersed in 10 ml of toluene in a different Schlenk bottle was added thereto. The mixture was stirred at room temperature for 12 hours, and then the solvent was removed by distillation. The residue was washed with 50 ml of hexane and then recrystallized from 30 ml of dichloromethane, whereby 1.2 g of a yellow fine crystal was obtained (yield: 25%).

(2) Polymerization of Propylene

A stainless steel-made autoclave having a content volume of 10 L which was dried by heating was charged with 5 L of dry heptane, 2.8 ml of a heptane solution containing 2.8 mmol of triisobutylaluminum and 3 ml of a heptane slurry containing 30 μmol of methylanilinium tetrakis(perfluorophenyl)borate, and the mixture was stirred for 10 minutes while controlling the temperature to 50° C.

Further, added thereto was 6 ml of a heptane slurry containing 3.8 μmol of (1,2'-dimethylsilylene)(2,1'-dimethylsilylene)-(indenyl)(3-trimethylsilylmethylindenyl)zirconium dichloride which was the transition metal compound complex prepared in (1) described above.

Further, hydrogen was introduced thereinto, and then the temperature was elevated up to 60° C. while stirring, followed by introducing propylene gas up to 0.49 MPa in terms of a partial pressure.

The propylene gas was supplied by means of a pressure governor during the polymerization reaction so that the pressure was maintained at a fixed level to polymerize propylene for 100 minutes. Then, the reaction solution was cooled down to remove unreacted propylene by depressurization, and the content was taken out.

The content was dried in air and then further dried at 80° C. under reduced pressure for 8 hours to thereby obtain 1100 g of polypropylene. The polymerization evaluation results thereof are shown in Table 1.

Production Example 2

Production 2 of Reactive Polypropylene (1) Synthesis of Metal Complex (1,2'-Dimethylsilylene)(2,1'-dimethylsilylene)-bis(3-trimethylsilylmethylindenyl)zirconium dichloride was synthesized in the following manner.

A lithium salt 3.0 g (6.97 mmol) of (1,2'-dimethylsilylene)(2,1'-dimethylsilylene)-bis(indene) was dissolved in 50 ml of THF (tetrahydrofuran) in a Schlenk bottle, and the solution was cooled down to −78° C. Iodomethyltrimethylsilane 2.1 ml (14.2 mmol) was slowly dropwise added thereto and stirred at room temperature for 12 hours.

The solvent was removed by distillation, and 50 ml of ether was added thereto, followed by washing the solution with a saturated ammonium chloride solution. After separating the solution, the organic phase was dried, and the solvent was removed by distillation, whereby 3.04 g (5.88 mmol) of (1,2'-dimethylsilylene)(2,1'-dimethylsilylene)-bis(3-trimethylsilylmethylindene) was obtained (yield: 84%).

Next, a Schlenk bottle was charged with 3.04 g (5.88 mmol) of (1,2'-dimethylsilylene)(2,1'-dimethylsilylene)-bis(3-trimethylsilylmethylindene) obtained above and 50 ml of ether under nitrogen flow. The solution was cooled down to −78° C., and a hexane solution (1.54M, 7.6 ml (1.7 mmol)) of n-BuLi was dropwise added thereto. The solution was heated up to room temperature and stirred for 12 hours, and then ether was removed by distillation. The resulting solid matter was washed with 40 ml of hexane, whereby 3.06 g (5.07 mmol) of the lithium salt was obtained in the form of an ether-added product (yield: 73%).

The results obtained by measurement by means of $^1$H-NMR (90 MHz, THF-d$^8$) are shown below.

δ: 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2 to 7.7 (m, 8H, Ar—H).

The lithium salt obtained above was dissolved in 50 ml of toluene under nitrogen flow. The solution was cooled down to −78° C., and a toluene (20 ml) suspension of 1.2 g (5.1 mmol) of zirconium tetrachloride which was cooled in advance to −78° C. was dropwise added thereto. After dropwise adding, the solution was stirred at room temperature for 6 hours, and then the solvent was removed from the reaction solution by distillation. The resulting residue was recrystallized from dichloromethane, whereby 0.9 g (1.33 mmol) of (1,2'-dimethylsilylene)(2,1'-dimethylsilylene)-bis(3-trimethylsilylmethylindenyl)zirconium dichloride was obtained (yield: 26%).

The results obtained by measurement by means of $^1$H-NMR (90 MHz, CDCl$_3$) are shown below.

δ: 0.0 (s, 18H, trimethylsilyl), 1.02, 1.12 (s, 12H, dimethylsilylene), 2.51 (dd, 4H, methylene), 7.1 to 7.6 (m, 8H, Ar—H).

(2) Polymerization of Propylene

A stainless steel-made autoclave having a content volume of 1.4 L which was dried by heating was charged with 0.4 L of dry heptane, 1 ml of a heptane solution containing 0.5 mmol of triisobutylaluminum and 2 ml of a heptane slurry containing 1.5 μmol of methylanilinium tetrakis(perfluorophenyl)borate, and the mixture was stirred for 10 minutes while controlling the temperature to 50° C. A heptane slurry 2 ml containing 0.5 μmol of (1,2'-dimethylsilylene)(2,1'-dimethylsilylene)-bis(3-trimethylsilylmethylindenyl)zirconium dichloride prepared in (1) described above was added thereto.

Next, the temperature was elevated up to 70° C. while stirring, and propylene gas was introduced thereinto up to 0.8 MPa in terms of a full pressure. The propylene gas was supplied by means of a pressure governor during the polymerization reaction so that the pressure was maintained at a fixed level to polymerize propylene for 120 minutes. Then, the reaction solution was cooled down to remove unreacted propylene by depressurization, and the content was taken out. The content was dried in air and then further dried at 80° C. under reduced pressure for 8 hours to thereby obtain 123 g of polypropylene. The polymerization evaluation results thereof are shown in Table 1.

TABLE 1

|  | Production Example | |
|---|---|---|
|  | 1 | 2 |
| Yield (g) | 1100 | 123 |
| Limiting viscosity (dl/g) | 0.40 | 0.86 |
| Weight average molecular weight (Mw) | 44000 | 114000 |
| Molecular weight distribution (Mw/Mn) | 1.84 | 2.08 |
| Content of end vinylidene group (group/molecule) | 0.974 | 0.930 |
| Stereoregularity [mmmm] (mole %) | 55.2 | 43.6 |
| Tm (° C.) | 98.2 | 71.0 |

Production Example 3

Production 1 of Graft Copolymer

A glass-made separable flask of 5 liter equipped with a stirring device was charged with 500 g of the reactive polypropylene produced in Production Example 1 and 1000 ml of dehydrated toluene to dissolve it while stirring at 70° C. Methyl acrylate 219 g and glycidyl methacrylate 322 g were slowly added thereto. Then, 83 ml of toluene in which 2 g of azobisisobutyronitrile was dissolved was added thereto in 2 hours, and after adding, they were reacted at the above temperature for 4 hours.

After finishing the reaction, a whole mount of the reaction mixture was transferred into a Teflon (registered trade name)-coated bat and dried in air, and then it was heated for 10 hours in a vacuum oven of 85° C. to remove the unreacted monomers and toluene. As a result thereof, 1029 g of a graft copolymer was obtained.

The copolymer was extracted with acetone to result in finding that a graft rate thereof was 70.8%. Further, a disappearance rate of the end vinylidene group was 54.2%, and it was shown that the graft copolymerization reaction was advanced.

Production Example 4

Production 2 of Graft Copolymer

A glass-made separable flask of 5 liter equipped with a stirring device was charged with 500 g of the reactive polypropylene produced in Production Example 1 and 830 ml of dehydrated toluene to dissolve it while stirring at 70° C. Methyl acrylate 76 g and glycidyl methacrylate 112 g were slowly added thereto. Then, 35 ml of toluene in which 0.84 g of azobisisobutyronitrile was dissolved was added thereto in 2 hours, and after adding, they were reacted at the above temperature for 4 hours.

After finishing the reaction, all mount of the reaction mixture was transferred into a Teflon (registered trade name)-coated bat and dried in air, and then It was heated for 10 hours in a vacuum oven of 85° C. to remove the unreacted monomers and toluene. As a result thereof, 687 g of a graft copolymer was obtained.

The copolymer was extracted with acetone to result in finding that a graft rate thereof was 19.5%. Further, a disappearance rate of the end vinylidene group was 43.1%, and it was shown that the graft copolymerization reaction was advanced.

Production Example 5

Production 3 of Graft Copolymer

A glass-made separable flask of 500 ml equipped with a stirring device was charged with 50 g of the reactive polypropylene produced in Production Example 2 and 100 ml of dehydrated toluene to dissolve it while stirring at 110° C. 2-Acryloyloxyethyl isocyanate 2.89 g and methyl acrylate 10 g were added thereto. PEROYL TCP 250 mg was added thereto as an initiator to react them at 110° C. for 2 hours.

After finishing the reaction, the reaction product was extracted with an acetone solvent, and a content of 2-acryloyloxyethyl isocyanate in the insoluble part was measured by NMR to find that it was 0.1 wt %.

Production Example 6

Production 4 of Graft Copolymer

A graft copolymer was produced in the same manner as in Production Example 3, except that an amount of toluene was changed to 1000 ml. As a result thereof, 1028 g of the graft copolymer was obtained.

The graft copolymers produced in Production Examples 3 to 6 are shown below. The monomer unit content was calculated from absorption based on a carbonyl group by an NMR method and an infrared absorption spectral method, and it shows a value based on the graft copolymer.

TABLE 2

|  |  | Production Example | | | |
|---|---|---|---|---|---|
|  |  | 3 | 4 | 5 | 6 |
| Yield |  | 1029 | 687 | 62.7 | 1028 |
| Monomer | Methyl acrylate | 15.8 | 5.6 | 4.9 | 15.7 |
| unit | Glycidyl methacrylate | 23.6 | 8.7 | — | 22.6 |
| content | 2-Acryloyloxyethyl | — | — | 0.1 | — |
| (% by mass) | isocyanate |  |  |  |  |
| Graft rate (%) |  | 70.8 | 19.5 | 6.7 | 70.7 |
| Weight average molecular weight |  | 49000 | 47500 | 115000 | 49000 |
| Molecular weight distribution (Mw/Mn) |  | 1.81 | 1.82 | 1.95 | 1.8 |
| Stereoregularity [mmmm] of side chain (mole %) |  | 55.2 | 55.2 | 43.6 | 55.2 |

The yield described in Table 2 shows a yield of the whole polymer. The others show the polymer structure in the acetone insoluble part.

Production Example 7

Production 3 of Reactive Polypropylene

A stainless steel-made autoclave having a content volume of 10 L which was dried by heating was charged with 4 L of dry heptane, 10 ml of a heptane solution containing 0.5 mmol of triisobutylaluminum and 20 ml of a heptane slurry containing 1.5 μmol of methylanilinium tetrakis(perfluorophenyl) borate, and the mixture was stirred for 10 minutes while controlling the temperature to 50° C. A heptane slurry 20 ml containing 0.5 μmol of (1,2'-dimethylsilylene)(2,1'-dimethylsilylene)-bis(3-trimethylsilylmethylindenyl)zirconium dichloride prepared in Production Example 2 (1) was added thereto.

Next, the temperature was elevated up to 70° C. while stirring, and propylene gas was introduced thereinto up to 0.8 MPa in terms of a full pressure. The propylene gas was supplied by means of a pressure governor during the polymerization reaction so that the pressure was maintained at a fixed level to polymerize propylene for 100 minutes. Then, the reaction solution was cooled down to remove unreacted propylene by depressurization, and the content was taken out. The content was dried in air and then further dried at 80° C. under reduced pressure for 8 hours to thereby obtain 1250 g of polypropylene. The polymerization evaluation results thereof are shown below.

Mw=116000, Mw/Mn=1.89, [mmmm]=42.8 mole %, Tm=71° C., end vinylidene: 0.94 group/molecule Production Example 8

Production 5 of Graft Copolymer

A glass-made separable flask of 5 liter equipped with a stirring device was charged with 1000 g of the reactive polypropylene produced in Production Example 7 and 2000 ml of dehydrated toluene to dissolve it while stirring at 70° C. n-Butyl acrylate 122.5 g and glycidyl methacrylate 35 g were slowly added thereto. Then, 100 ml of toluene in which 3 g of azobisisobutyronitrile was dissolved was added thereto in 20 minutes, and after adding, they were reacted at the above temperature for 2 hours. Then, 100 ml of toluene in which 3 g of azobisisobutyronitrile was dissolved was further added thereto to continue the reaction for 4 hours.

After finishing the reaction, a whole mount of the reaction mixture was transferred into a Teflon (registered trade name)-coated bat and dried in air, and then it was heated for 10 hours in a vacuum oven of 85° C. to remove the unreacted monomers and toluene. As a result thereof, 1157 g of a graft copolymer was obtained.

The copolymer was extracted with acetone to result in finding that a graft rate thereof was 18.2%. Further, a disappearance rate of the end vinylidene group was 40%, and it was shown that the graft copolymerization reaction was advanced.

Example 1

A labo plastomill (content volume: 50 ml) manufactured by Toyo Seiki Seisakusho, Ltd. was charged with 20 parts by mass of the graft copolymer produced in Production Example 3 and 80 parts by mass of polycarbonate having an end hydroxyl group (produced by using bisphenol A and phosgene as raw materials, viscosity average molecular weight (Mv)=16500, an amount of a OH group: 0.92 group/molecule) in a total amount of 55 g, and the mixture was kneaded at 250° C. and 100 revolutions/minute for 10 minutes. After finishing kneading, the composition thus obtained was dyed with ruthenium and observed under a transmission type electron microscope. As a result thereof, a proportion of the domains of 20 to 100 nm based on the whole domains was almost 60%, and in the remainder, the domain particle diameter was distributed in a range of 1 to 4 µm.

Example 2

The components were kneaded in the same manner as in Example 1, except that the graft copolymer produced in Production Example 5 was used and that the kneading time was changed to 5 minutes. A form thereof was observed in the same manner to find that an average particle diameter was 2.4 µm.

Comparative Example 1

The components were kneaded in the same manner as in Example 1 to obtain a resin composition, except that polypropylene (J-5085H, manufactured by Prime Polymer Co., Ltd.) was used in place of the graft copolymer. A form thereof was observed to find that an average particle diameter was 10 µm.

Example 3

The components were molten and kneaded at a barrel temperature of 230° C., a discharge resin temperature of 250° C. and a revolution of 250 rpm in blending amounts (unit: parts by mass) described in Table 3 by means of a kneading extrusion equipment Labotex (TEX-44 L/D=52, manufactured by The Japan Steel Works, Ltd.), and the kneaded matter was subjected to strand cut to produce a resin composition. The injection properties thereof were evaluated and shown in Table 4.

The physical properties were measured according to the following methods:

tensile property: JIS K161: 94 bending property: JIS K7171: 94 thermal deformation temperature: JIS K191-1

Example 4 and Comparative Example 2

The components were molten and kneaded in the same manner as in Example 3 to produce a resin composition, except that the blending amounts were changed as described in Table 3. The injection properties thereof were evaluated and shown in Table 4.

TABLE 3

| | | Example | | Comparative Example |
|---|---|---|---|---|
| | | 3 | 4 | 2 |
| Graft copolymer | Production Example 3 | 5 | — | — |
| | Production Example 4 | — | 5 | — |
| Random copolymer | | — | — | 5 |
| Polypropylene | | 15 | 15 | 15 |
| Polycarbonate | | 80 | 80 | 80 |

The following compounds were used in Examples 3 and 4 and Comparative Example 2:

Random copolymer: ethylene/glycidyl methacrylate random copolymer (average molecular weight: 290000, glycidyl methacrylate content: 12% by mass, produced by a high pressure radical method)

Polypropylene: J-5085H, manufactured by Prime Polymer Co., Ltd.

Polycarbonate: end hydroxyl group-containing polycarbonate (viscosity average molecular weight (Mv)=16500, an amount of a hydroxyl group: 0.92 group/molecule)

TABLE 4

|  |  | Example | | Comparative Example |
|---|---|---|---|---|
|  |  | 3 | 4 | 2 |
| Tensile property | Yield stress (MPa) | 46 | 46 | 38 |
|  | Elongation (%) | 3.7 | 4.3 | 4.5 |
|  | Elastic modulus (MPa) | 2090 | 2010 | 1820 |
| Bending property | Yield stress (MPa) | 68 | 65 | 59 |
|  | Elastic modulus (MPa) | 2060 | 1970 | 1800 |
| Thermal deformation temperature (° C.) | | 118 | 118 | 116 |

Example 5

Polycarbonate (end hydroxyl group-containing polycarbonate (viscosity average molecular weight (Mv)=16500, amount of a hydroxyl group: 0.92 group/molecule)) 80 parts by mass, the graft copolymer 5 parts by mass produced in Production Example 6 and J785H (block polypropylene, MFR=13, manufactured by Prime Polymer Co., Ltd.) 15 parts by mass as polypropylene were molten and kneaded at a barrel temperature of 230° C., a discharge resin temperature of 250° C., a residence time of 20 minutes, a discharge amount of 5 kg/hour and a revolution of 250 rpm, and the kneaded matter was subjected to strand cut to produce a resin composition.

The above resin composition 80 parts by mass and talc (trade name: HT13B, manufactured by Asada Milling Co., Ltd.) 20 parts by mass were molten and kneaded at a barrel temperature of 250° C., a discharge amount of 30 kg/hour and a revolution of 300 rpm by means of a melting extrusion equipment (TEM-35B, manufactured by Toshiba Machine Co., Ltd.), and the kneaded matter was subjected to strand cut to produce a resin composition. The injection properties thereof were evaluated and shown in Table 5.

Comparative Example 3

A resin composition provided with talc was obtained in the same manner as in Example 5, except the graft copolymer produced in Production Example 6 was changed to a random copolymer (ethylene/glycidyl methacrylate random copolymer (average molecular weight: 290000, glycidyl methacrylate content: 12% by mass, produced by a high pressure radical method)). The results thereof are shown in Table 5.

Comparative Example 4

Polycarbonate (end hydroxyl group-containing polycarbonate (viscosity average molecular weight (Mv)=16500, amount of a hydroxyl group: 0.92 group/molecule)) 64 parts by mass, J785H (block polypropylene, MFR=13, manufactured by Prime Polymer Co., Ltd.) 16 parts by mass as polypropylene and talc (trade name: HT13B, manufactured by Asada Milling Co., Ltd.) 20 parts by mass were molten and kneaded on the same conditions by means of the same melting extrusion equipment as shown in Example 5, and the kneaded matter was subjected to strand cut to produce a resin composition. The injection properties thereof were evaluated and shown in Table 5.

TABLE 5

|  |  | Example | Comparative Example | |
|---|---|---|---|---|
|  |  | 5 | 3 | 4 |
| Tensile property | Yield stress (MPa) | 45 | 39 | 47 |
|  | Elongation (%) | 3 | 6 | 2 |
|  | Elastic modulus (MPa) | 3300 | 2380 | 3320 |
| Bending property | Yield stress (MPa) | 71 | 60 | 72 |
|  | Elastic modulus (MPa) | 3720 | 2610 | 3780 |
| Thermal deformation temperature (° C.) | | 128 | 113 | 129 |
| Peeling evaluation | | ○ | ○ | X |

The physical properties were measured in the same manner as in Example 3.

The peeling evaluation method is shown below.

A tensile test piece was bent five times at 180° to visually observe peeling and cracking of the bent part:

X: peeling and cracking were caused

O: peeling and cracking were not observed

Example 6 and Comparative Example 5

The components were molten and kneaded at a barrel temperature of 250° C., a discharge resin temperature of 260° C. and a revolution of 250 rpm in blending amounts (unit: parts by mass) described in Table 6 by means of a double shaft kneading extrusion equipment, and the kneaded matter was subjected to strand cut to produce resin compositions. The injection properties thereof were evaluated and shown in Table 7.

The physical properties were measured according to the following methods:

tensile property: JIS K161: 94 bending property: JIS K7171: 94 thermal deformation temperature: JIS K191-1 spiral flow: a length (unit: cm) of a spiral obtained on conditions shown below by means of a molding equipment shown below was measured:

molding equipment: NEX500, manufactured by Nissei Plastic Industrial Co., Ltd.

molding conditions: barrel set temperature: 280° C., die temperature: 80° C., injection pressure: 125 MPa, die: spiral die of 10 mm×2 mm

TABLE 6

|  |  | Example 6 | Comparative Example 5 |
|---|---|---|---|
| Graft copolymer | Production Example 8 | 5 | — |
| Random copolymer |  | — | 5 |
| Polypropylene |  | 15 | 15 |
| Polycarbonate |  | 80 | 80 |

Random copolymer: ethylene/glycidyl methacrylate random copolymer (average molecular weight: 290000, glycidyl methacrylate content: 12% by mass, produced by a high pressure radical method)

Polypropylene: J785H, manufactured by Prime Polymer Co., Ltd.

Polycarbonate: end hydroxyl group-containing polycarbonate (viscosity average molecular weight (Mv)=16500, an amount of a hydroxyl group: 0.92 group/molecule)

TABLE 7

|  |  | Example 6 | Comparative Example 5 |
|---|---|---|---|
| Bend elasticity | Yield stress (MPa) | 64.4 | 62 |
|  | Elastic modulus (MPa) | 1940 | 1812 |
| Thermal deformation temperature (° C.) |  | 114 | 114 |
| Peeling evaluation |  | ○ | ○ |
| Spiral flow |  | 82.2 | 45 |

Example 7

A labo plastomill (content volume: 50 ml) manufacturer by Toyo Seiki Seisakusho, Ltd. was charged with 20 parts by mass of the graft copolymer produced in Production Example 8 and 80 parts by mass of polycarbonate having an end hydroxyl group (produced by using bisphenol A and phosgene as raw materials, viscosity average molecular weight (Mv)=16500, an amount of a OH group: 0.92 group/molecule) in a total amount of 55 g, and the mixture was kneaded at 250° C. and 100 revolutions/minute for 10 minutes. After finishing kneading, the composition thus obtained was dyed with ruthenium and observed under a transmission type electron microscope. The average dispersed particle diameter was measured in an observed dispersion state to find that the face average particle diameter was 1.5 μm and that the particle diameter distribution assumed a single peak pattern and showed a high uniform dispersibility.

Examples 8 and 9 and Comparative Examples 6 and 7

The components were molten and kneaded in blending amounts (unit: parts by mass) described in Table 8 on the same conditions as in Example 7 to produce composite materials of polyester and polyamide. In this connection, the adhesive property, the elongation property and the melt state were evaluated, and the results thereof are shown in Table 9. Further, the above composite materials were used to prepare hot press sheets (thickness: 1 mm), and an appearance and a peeling property thereof were observed. The results thereof are shown in Table 9.

The evaluation criteria are shown below.

Adhesive property (degree of adhesion onto the barrel and the rotor in taking out the molten matter from the plastomill)
O: no adhesion or slight adhesion
X: adhered onto the barrel and the rotor Surface state (visual evaluation of the surface of the molten matter)
O: surface is smooth and glossy
Δ: surface is low in glossiness and irregular
X: surface is not glossy Elongation property (elongation property observed when the molten matter is drawn)
O: not broken until the molten matter is solidified in a drawing step
Δ: broken before the molten matter is solidified
X: unable to be drawn Appearance
O: glossy
X: surface is not glossy and is irregular Peeling property (visual observation of the R part when the sheet is bent by 180°)
O: no cracks are produced
Δ: cracks are partially produced

TABLE 8

|  |  | Example | | Comparative Example | |
|---|---|---|---|---|---|
|  |  | 8 | 9 | 6 | 7 |
| Graft copolymer | Production Example 8 | 3 | 3 | — | — |
| Polypropylene |  | 15 | 15 | 15 | 15 |
| Polyester |  | 82 | — | 85 | — |
| Polyamide |  | — | 82 | — | 85 |

Polypropylene: J785H, manufactured by Prime Polymer Co., Ltd. Polyester: SA-1260, manufactured by Unitika, Ltd. Polyamide (Nylon 6): 1030B, manufactured by Ube Industries, Ltd.

TABLE 9

|  |  | Example | | Comparative Example | |
|---|---|---|---|---|---|
|  |  | 8 | 9 | 6 | 7 |
| Results in melting and combining | Adhesive property | ○ | ○ | X | X |
|  | Surface state | ○ | ○ | Δ | X |
|  | Elongation property | ○ | ○ | X | Δ |
| Properties of pressed sheet | Appearance | ○ | ○ | X | X |
|  | Peeling property | ○ | ○ | Δ | Δ |

INDUSTRIAL APPLICABILITY

According to the present invention, capable of being obtained is a resin composition containing a resin component prepared by blending a specific engineering plastic with a graft copolymer in which a polyolefin chain length is sufficiently long and in which a main chain is provided with a functional group interacting with an engineering plastic. The resin composition of the present invention can be used for development of materials such as composite materials of engineering plastics and polyolefins.

The invention claimed is:
1. A resin composition containing a resin component prepared by blending a graft copolymer with an engineering plastic, wherein the above graft copolymer is a graft copolymer satisfying (a) to (e) shown below:
(a) a graft rate is 1 to 150% by mass,
(b) a weight average molecular weight measured by GPC is 500 to 400000,
(c) a molecular weight distribution (Mw/Mn) is 1.5 to 4,
(d) a main chain is a polymerization chain containing 1 to 100% by mass of a monomer unit having a functional group interacting with an engineering plastic and
(e) a side chain is a homopolymerization chain of a single kind selected from α-olefins having 3 to 28 carbon atoms or a copolymerization chain of two or more kinds selected therefrom or a copolymerization chain comprising an α-olefin unit having 3 to 28 carbon atoms and an ethylene unit which accounts for 50% by mass or less, and a mesopentad ratio [mmmm] of the polymerization chain is 30 to 80 mole %;
wherein the graft copolymer is formed by copolymerization reaction of a reactive polyolefin forming the side chain (e) and the monomer forming the main chain (d) in the presence of a radical initiator at a temperature of from 40° C. to 110° C., wherein the reactive polyolefin has an amount of an end unsaturated group per molecule of 0.5 to 1.0 group.

2. The resin composition according to claim 1, wherein the graft copolymer is formed by copolymerization reaction of a reactive polyolefin satisfying (B) to (C) shown below with the monomer forming the main chain of the graft copolymer:

(B) a mesopentad ratio [mmmm] is 30 to 80 mole % and
(C) a homopolymerization chain of a single kind selected from α-olefins having 3 to 28 carbon atoms or a copolymerization chain of two or more kinds selected therefrom or a copolymerization chain comprising an α-olefin unit having 3 to 28 carbon atoms and ethylene which accounts for 50% by mass or less.

3. The resin composition according to claim 2, wherein the reactive polyolefin is produced under the presence of a metallocene catalyst.

4. The resin composition according to claim 3, wherein the metallocene catalyst is a di-cross-linked complex represented by Formula (I):

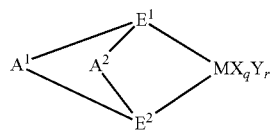

(I)

wherein M represents a metal element of a 3rd to 10th group in the periodic table; $E^1$ and $E^2$ each represent a ligand selected from a cyclopentadienyl group, a substituted cyclopentadienyl group, an indenyl group, a substituted indenyl group, a heterocyclopentadienyl group, a substituted heterocyclopentadienyl group, an amide group, a phosphine group, a hydrocarbon group and a silicon-containing group, and they form a cross-linking structure via $A^1$ and $A^2$; $E^1$ and $E^2$ may be the same as or different from each other, and at least one of $E^1$ and $E^2$ is a cyclopentadienyl group, a substituted cyclopentadienyl group, an indenyl group or a substituted indenyl group; X represents a δ-bonding ligand, and when a plurality of X is present, plural X may be the same or different and may be cross-linked with other X, $E^1$, $E^2$ or Y; Y represents a Lewis base, and when a plurality of Y is present, plural Y may be the same or different and may be cross-linked with other Y, $E^1$, $E^2$ or X; $A^1$ and $A^2$ are divalent cross-linking groups which bond two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, and R$^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(valence of M)–2], and r represents an integer of 0 to 3.

5. The resin composition according to claim 1, wherein the functional group interacting with the engineering plastic is a functional group selected from an ester group, a carboxyl group, a carboxylic anhydride residue, an aromatic ring-containing group, a hydroxyl group, an epoxy group, an amino group and an isocyanate group.

6. The resin composition according to claim 1, wherein the monomer forming the main chain of the graft copolymer is at least one monomer represented by Formula (III):

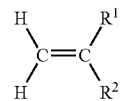

(III)

wherein $R^1$ represents a hydrogen atom, a halogen atom or a hydrocarbon group having 1 to 20 carbon atoms; $R^2$ represents any of groups represented by Formulas (IV) to (VII):

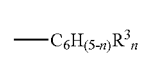

(IV)

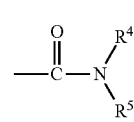

(V)

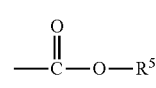

(VI)

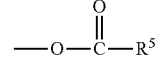

(VII)

$R^3$ represents a hydrogen atom, a hydrocarbon group having 1 to 12 carbon atoms or a group having 1 to 12 carbon atoms which contains any atom of an oxygen atom, a nitrogen atom and a silicon atom; $R^4$ represents a hydrogen atom or a hydrocarbon group having 1 to 12 carbon atoms; $R^5$ represents a hydrogen atom, a hydrocarbon group having 1 to 12 carbon atoms or a group having 1 to 12 carbon atoms which has any group of an epoxy group, an amino group, an isocyanate group, a hydroxyl group and a carboxyl group; and n is an integer of 0 to 5.

7. The resin composition according to claim 1, wherein the monomer forming the main chain of the graft copolymer is at least one selected from [I] acrylic acid and derivatives thereof, [II] methacrylic acid and derivatives thereof, [III] vinyl esters and derivatives thereof or alkoxyvinylsilane and [IV] styrene and derivatives thereof.

8. The resin composition according to claim 1, wherein the monomer forming the main chain of the graft copolymer is at least one selected from the following A group and at least one selected from the following B group:
  A group: [V] maleic anhydride and substitution products thereof, [VI] maleic acid and esters thereof and [VII] maleimide and substitution products thereof and
  B group: [I] acrylic acid and derivatives thereof, [II] methacrylic acid and derivatives thereof, [III] vinyl esters and derivatives thereof or alkoxyvinylsilane, [IV] styrene and derivatives thereof and [VIII] α-olefins.

9. The resin composition according to claim 1, wherein the engineering plastic is selected from polyamide, polyacetal, polycarbonate, polyester, polyphenylene ether, syndiotactic polystyrene and polyphenylene sulfide.

10. The resin composition according to t claim 1, wherein a blending amount of the engineering plastic is 1 to 1000 parts by mass based on 1 part by mass of the graft copolymer.

11. The resin composition according to claim 1, further containing polyolefin, wherein a blending amount of the polyolefin is 2 to 50 parts by mass, and a blending amount of the graft copolymer is 0.005 to 20 parts by mass each based on 100 parts by mass of the engineering plastic.

12. A master batch containing the resin composition according to claim 1.

13. A molded matter prepared by using the resin composition according to claim 1.

* * * * *